United States Patent [19]

Olney, Jr. et al.

[11] 3,765,075

[45] Oct. 16, 1973

[54] METHOD AND APPARATUS FOR INSERTING PINS INTO A CIRCUIT BOARD

[75] Inventors: Frederick D. Olney, Jr., Phoenix; Robert O. Crump, Scottsdale; John L. Kowalski, Phoenix, all of Ariz.

[73] Assignee: Honeywell Information Systems, Inc., Waltham, Mass.

[22] Filed: Jan. 3, 1972

[21] Appl. No.: 215,970

[52] U.S. Cl. .............................................. 29/203 B

[51] Int. Cl. .......................................... H05k 13/04

[58] Field of Search ...................... 29/203 B, 203 P, 29/203 U, 208 C, 203 R

[56] References Cited

UNITED STATES PATENTS 3,528,160 9/1970 Wadleigh ......................... 29/203 B 3,601,890 8/1971 Pityo et al. ........................ 29/203 B 3,611,561 10/1971 Dosier .......................... 29/203 P X

*Primary Examiner*—Thomas H. Eager

*Attorney*—James A. Pershon et al.

[57] ABSTRACT

A cluster pin insertion machine positions a predrilled circuit board beneath a pin insertion head having a plurality of pins positioned therein. The machine cycles to insert the pins into the circuit board and then returns the head to a preload position where pin feeding apparatus, continuously loaded by a hopper, inserts pins into the head. The pneumatically operated head inserts the preloaded pins into the predrilled holes after which the circuit board is incrementally repositioned by an X-Y positioning table controlled by a photosensor system.

22 Claims, 26 Drawing Figures

Patented Oct. 16, 1973 3,765,075

16 Sheets-Sheet 1

METHOD AND APPARATUS FOR INSERTING PINS INTO A CIRCUIT BOARD

BACKGROUND OF THE INVENTION

1. Field of the Invention

This invention relates to a method and apparatus for inserting pins in a circuit board, and more particularly to the insertion of a plurality of pins, substantially simultaneously, into a circuit board.

2. Description of the Prior Art

Circuit boards are important components of many electronic devices currently manufactured, including high speed information processing systems. The circuit boards are used for interconnecting various types of circuits and as carriers for circuit components or modules. Microcircuits are fabricated or integrated as modules, and each module may replace a large number of circuits using discrete circuit components. Typically, a plurality of these modules may be mounted on individual circuit boards. The circuit modules need to be connected to other modules on the board and also to modules on other boards.

In common usage today are multilayer circuit boards in which a number of connectors, or circuit runs, are etched on a single layer, and multiple layers are insulatively bonded together by epoxy or fiberglass, into a multilayer board. Whether a particular circuit board is a multilayer board or whether it includes only a two layer board, having a top layer and a bottom or underneath layer, the various components and various connectors on the board need to be interconnected, as earlier stated, to other circuits on the board and to circuits on other, or adjacent, boards.

Typically, a circuit board may include a plurality of components, such as integrated circuit modules, on one side of the board and the other side of the board may be used to interconnect modules by discrete wires. In such case, a plurality of apertures is drilled through the board and then plated through with a conductive layer to increase the reliability of connections used or made with each hole. A pin is then driven through each hole. The pins are used as connecting points for the components, such as circuit modules, and for connectors, such as wire leads.

The location of the holes on the circuit board are carefully defined by specific dimensional tolerances. Moreover, the apertures or holes are usually aligned in parallel rows and columns and in clusters or groups of seven or eight holes, although the number may be fewer, or, if desired, may be greater. Since seven holes to a cluster appears to be preferred under contemporary state of the art conditions, such will be used in describing the present invention.

After the holes or apertures have been drilled and plated through, the next step in the fabrication of the circuit board is to insert pins into and through the holes. Straight pins are preferred in contemporary technology circuit boards. Dimensionally such pins may typically be about 0.875 inches long and about 0.025 inches square. When the pins have been inserted into and through a circuit board, the board resembles a flat, squarish pin cushion with pins extending above and below the cushion about equal distances and in regularly spaced and aligned rows and columns.

Heretofore the pins have been inserted into circuit boards singly. The pins are usually held together at their center points by belts or reels in parallel alignment. As a circuit board moves under an insertion device, the belt, reel, or other means used to hold the pins together moves along and places a single pin over a single hole. The pin is then inserted into a hole. The board moves and the supply of pins moves until a single pin is again indexed over a single hole. It is obvious that such straight pin insertion system has disadvantages, such as; relatively slow speed, expense due to the pins, each of which is discretely held by some form of fastening means, and reliability due to the possibility of foreign matter from the fastening or holding means being inserted into the holes of the circuit board with the pins.

It is therefore highly desirable to have an apparatus for inserting a plurality of pins into circuit board holes substantially simultaneously. This apparatus must also obviate the expense or cost of the straight pins of the prior art. If pins can be fabricated in bulk and can be fed into pin insertion apparatus from a bulk container in which the pins are randomly situated, the expense of the belts or cartridges of pins would be obviated. Moreover, the possibility of foreign matter entering into a plated through hole in the circuit board with the pin would be greatly reduced.

Another and perhaps inherent problem of the prior art is in the manufacture of the pins themselves. In order for pins to be fabricated and at the same time secured together as in reels, or cartridges, or on belts, the simplest and easiest way of accomplishing such pins is by simply clipping off individual pins from a drawn length of wire. Under such circumstances the joint between pins or the location of the cut or clip which separates a pin from a folloing pin, may not be dimensionally true and may include a rough or serrated point. In such a case there is a potential problem when the pins are used with typical wire wrap equipment. If the point of the pin is not rather blunt or in a pyramidal type configuration which would allow the wire wrap drill to move smoothly on the pin, the drill wears in the location at which it makes contact with the rough or serrated point of a pin. Moreover if each pin is inserted into a board by a single insertion head, as such head wears the alignment of the pins will be exactly the same. This may also contribute to the wear of a wire wrap machine drill. For example, if every pin is aligned in exactly the same fashion and such alignment is slightly off from the normal, each pin will make physical contact with the wire wrap drill in exactly the same location rather than at random. This constant wear will also decrease the lift cycle of the drill.

The complexity of circuits used in contemporary electronic apparatus, such as information processing systems, may require hundreds (or thousands) of connector pins on each board. Pins are normally forced into and through the circuit boards at right angles to the planar surface of the board. High pressure in the form of mechanical force is used to insert the pins into and through the board. The sheer magnitude of pins used in each information processing system presses the need for a pinning machine that automatically feeds bulk stored pins for cluster insertion into printed circuit boards.

SUMMARY OF THE INVENTION

The invention herein described and claimed comprises apparatus for inserting a plurality of pins in clusters into a circuit board. Pins in bulk configuration are fed to insertion heads and the heads insert the pins, in clusters, into predrilled and aligned holes in a circuit board. While the heads are being loaded with pins the circuit board is incrementally moved so as to sequentially position a plurality of holes in the circuit board underneath the head for the next pin insertion cycle.

Among the objects of this invention are the following:

- to provide new and useful pin insertion apparatus;
- to provide new and useful apparatus for inserting a plurality of pins into a circuit board;
- to provide new and useful apparatus for inserting a plurality of pins into a circuit board from bulk containers;
- to provide new and useful apparatus for indexing a circuit board for the insertion of a plurality of pins into the circuit board;
- to provide new and useful electrical circuitry for sequentially loading a plurality of pins into an insertion head, moving a circuit board to index a plurality of pins under a pin insertion head, and inserting pins from the insertion head into holes in the circuit board.

DESCRIPTION OF THE PREFERRED EMBODIMENT

Figures 1, 2:
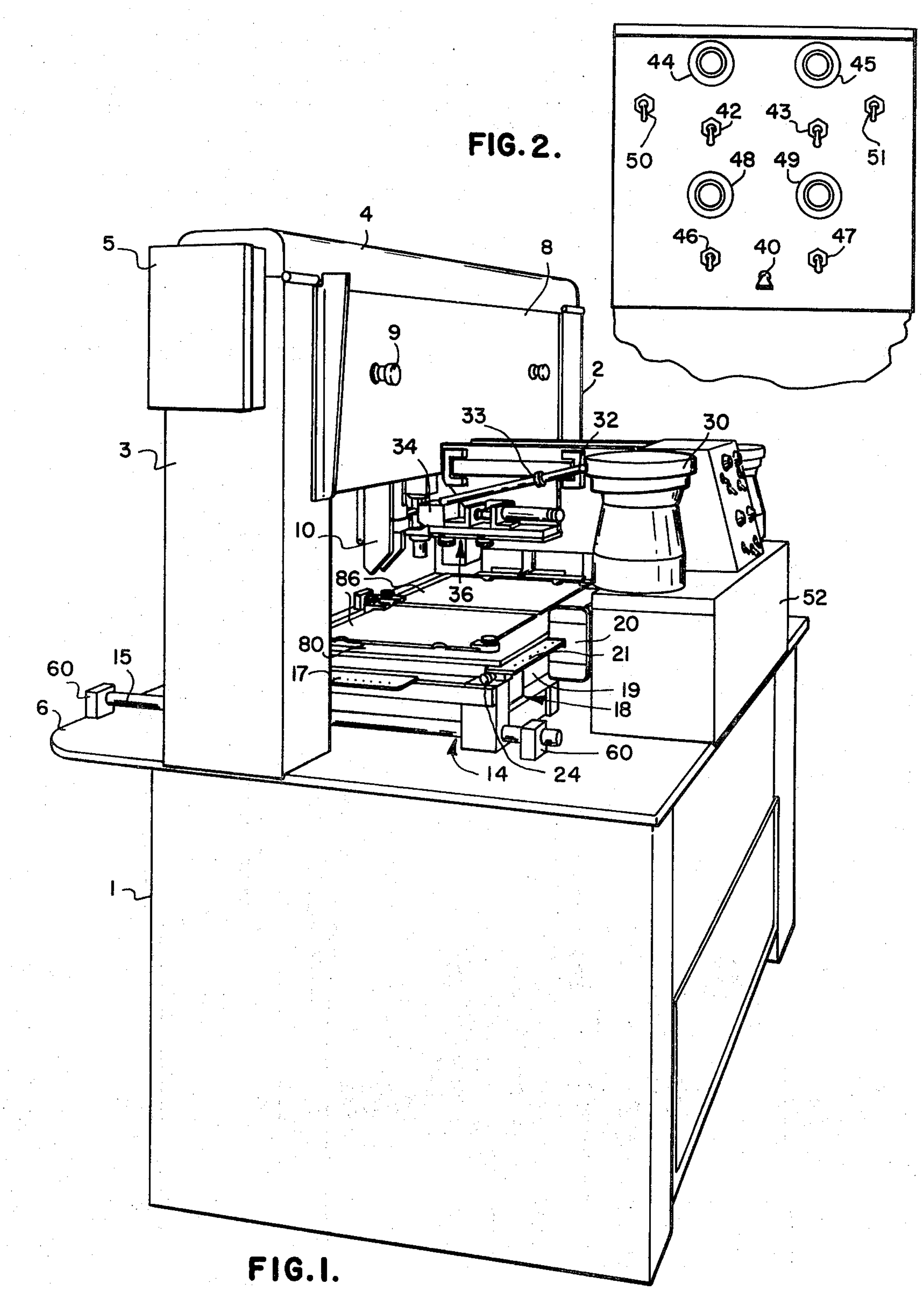
FIG. 1 is an isometric side view of apparatus embodying the present invention.
FIG. 2 is an enlarged view of a panel from FIG. 1.
Figures 3, 4:
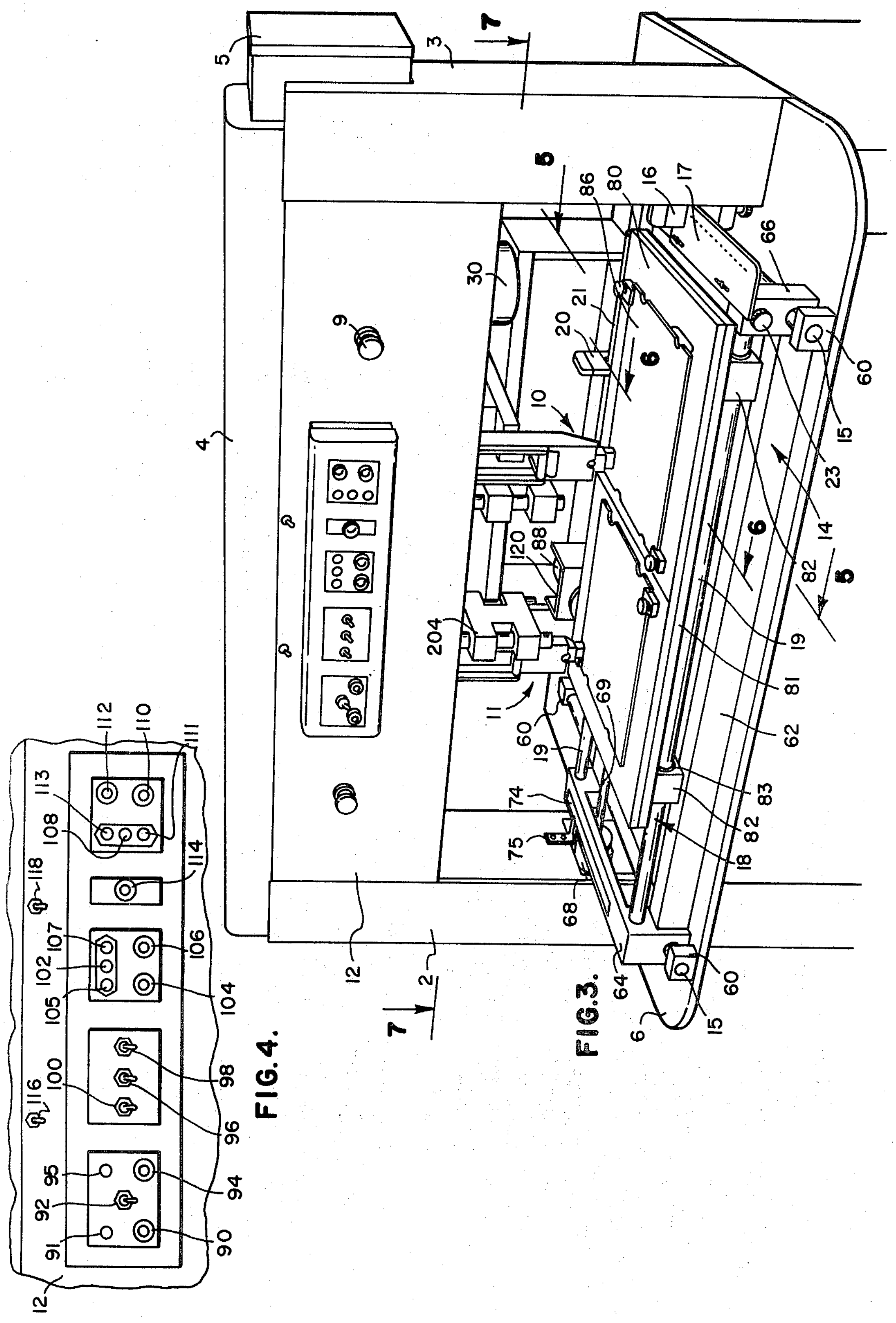
FIG. 3 is an isometric front view of the apparatus of FIG. 1.
FIG. 4 is an enlarged view of a panel from FIG. 3.

FIG. 1 comprises an isometric side view of apparatus embodying the present invention. While FIG. 1 shows dual pin insertion apparatus, both of which are mounted on the same support frame, detailed description will generally refer to only the apparatus required to pin a single board at a time, rather than apparatus which may include the means for pinning two boards simultaneously, as shown in FIGS. 1 and 3. Included in FIG. 1 are a lower support frame or base, an upper support frame or bridge structure which includes a pair of end posts 2, 3, and a cross member 4 extending between the end posts and a platform or table 6 intermediate the base and bridge structure. Within the lower support frame or base is the power supply for the apparatus, the required circuitry and logic, transformers, pulse generators for controlling movement of drive motors, cooling fans, and other necessary and associated components.

The upper support bridge structure includes an electrical junction box 5 secured to end post 3. Power for the apparatus flows through the junction box. Back panel 8 extends between the end posts 2 and 3 and downwardly from cross member 4. A pair of emergency stop switches are located at opposite ends of back panel 9. When either is depressed all power to the apparatus is disconnected. The bridge structure also provides support and housing for a pair of pin insertion heads and associated apparatus, of which only a head 10 is shown in FIG. 1. The upper support frame or bridge is in the configuration of an inverted U with the pair of vertical end posts 2 and 3 supporting a horizontally disposed elongated cross member 4. The cross member includes front and back panels and the pin insertion heads and their rams and actuation apparatus are supported by and located between the front and back panel beneath cross member 4.

The platform or table 6 is supported by the base 1. The base and table provide support for the bridge structure. The platform or table also provides support for the circuit boards through a pair of moving drive units 14 and 18, referred to generally as the "Y" drive unit and the "X" drive unit, respectively. A pair of guide rods 15, only one of which is shown in FIG. 1, provides support and guidance for Y drive unit 14 which moves "in" and "out" to move the boards in and out for pinning operations. Guide rods 15 are supported on table 6 by blocks 60. The X drive unit 18 is supported on and moves with the Y drive unit 14 as it moves in and out. The X drive unit 18 moves on a pair of guide rods 19, only one of which is shown in FIG. 1, and moves in what is termed the X directions, either "left" or "right." A pair of circuit boards 86 are secured to a table 80 or X drive unit 18 for the pinning operations. Appropriate locating apparatus and securing apparatus are used to index and hold each board on the table for the proper pinning of the boards.

Movement of the X and Y drive units is controlled separately by a pair of drive motors. The indexing and moving of each drive unit to move the table in discrete increments is controlled through a pair of photo sensor systems. Each photo sensor system includes light sources and photo cells connected to the motor drive circuitry through appropriate amplifiers. Each photo sensor system also includes a metal strip, appropriately fastened to each drive unit, with a plurality of holes or apertures drilled or punched through the strip at appropriate intervals so as to define the discrete increments or distances for the table to move. There are stop holes for incremental stops, and limit holes for changing direction of travel at the "in" and "out" and "left" and "right" limits of travel for the Y and X table movements, respectively. The punched metal strips comprise programs for controlling the pattern of pins inserted on boards. Punched metal strip 17, which controls movement of the table in the Y direction, is secured to the Y drive unit 14 and it moves intermediate a stationary photo sensor system which includes photo cells and light sources secured to the upright or vertically extending end post 3 of the upper support frame.

Photo sensor system 20 for the X directional control includes photo cells and light sources which are carried by or secured to the Y drive unit, while its associated or cooperating punched metal strip 21 is secured to and carried by the X drive unit. The punched metal strip 21 is secured to the Y drive unit by appropriate fasteners, such as screws (not shown) extending through elongated slots in the metal strip. The location of the metal strip may be adjusted as desired by loosening the screws and by then rotating a thumbscrew 24. The thumbscrew 24 is secured to both the drive unit and the metal strip through a micrometer or vernier screw arrangement.

In addition to a photo cell and light source for controlling the X and Y movement of the table incrementally for row and column pinning operations, each photosensor system includes a second photocell and light source for sensing the X and Y limits of movement for the table. Each punched metal strip accordingly includes limit holes at opposite ends of each strip to denote the X an Y limits of travel for the table. For sensing the limits, a separate photocell and light source and amplifier is used because a reverse of direction is required and accordingly a different or separate signal is needed. When an X limit is sensed, the next movement of the board is an incremental Y movement. The following movement is an incremental X movement in the opposite or reverse X direction. Each Y movement is followed by a movement in the X direction, including a movement which senses a Y "in" limit. However, upon sensing an X limit after sensing a Y "in" limit, the first incremental Y "out" movement will cause the apparatus to shut down because a board has been completely pinned and the power circuit is disrupted by the movement. The table is then manually moved "out" until the Y "out" limit is reached. The completed board or boards are removed and a new board or boards secured in its place.

Since the last movement was a Y move, the next movement will be an X move. When the X limit is sensed, the next movement will be an incremental Y "in" movement. It is the photosensor systems which signal the table to stop and which signal a change or reversal of directions. It will be noted that pinning occurs only when the Y table is moving "in." This will be discussed in detail below.

After a change of direction from X to Y, as when an X limit has been sensed, the completion of a single incremental movement in the Y direction will then be followed by an X movement. A Y directional change is not followed by continued Y directional movements until a Y limit is sensed. A change of direction from Y to X is accomplished after each Y movement. Thus the pinning operation is accomplished across a board in rows which require the movement of the table in an X direction, either left or right, until a row has been completely pinned. Upon the completion of a row, the sensing of a Y limit causes a change in direction such that the next movement of the table is in the Y direction. Thus the table moves incrementally the distance of one row in the Y direction to begin the next pinning operation. After the Y movement, a change of direction is accomplished and the table then moves in the opposite X direction from the previous row for which the pinning has just been accomplished. If a row is pinned as the table moves from left to right in the X direction, after an incremental move in the Y direction the next row is pinned as the table moves from right to left in the X direction.

The platform or table 6 also provides support for pin feeding an loading apparatus. The pin feeding apparatus includes a main bowl feeder 30 disposed on support structure 52, a delivery tube 32 extending from the main bowl feeder to loading hopper 34, and loader 36 which moves pins from loading bins in the hopper to a pin insertion head. The main bowl feeder includes an inclined helical ramp extending on the interior or inner periphery of the bowl continuously from the bottom of the bowl to the top of the bowl. A vibrator vibrates the bowl in such a manner that pins dumped into the bowl in a random fashion, as from a bulk container, are continuously moved up the interior helical ramp by vibratory action of the bowl and are then fed to a loading hopper 34 through a pin delivery tube 32. The vibratory action of the bowl is common to the state of the art and is such that the bowl moves upward and forward and then jumps downward and backward in the opposite direction to its starting point while leaving the pins, as it were, standing still in the air. When the pins again contact the ramp of the bowl, a different portion of the ramp contacts the pins and carriers them forward again an incremental distance where the same action is repeated. The net effect of the vibration or jumping motion of the bowl feeder is thus to move the pins slowly up the ramp where the pins are then fed through a delivery tube 32 to a loading hopper 34 for insertion into a head and ultimately into a circuit board. The movement of the pins up the inclined helical ramp within a bowl by the vibratory method is not unlike that of a helical screw thread in that something, such as the pins, may be transported through a vertical and perhaps longitudinal distance while the means of transportation stays relatively in one location while movement is effected.

The inclined ramp is relatively narrow and thus the pins moving thereon are substantially straight with respect to the length of the ramp. Any pins which are at a skew angle with respect to the ramp fall back into the bowl. Accordingly, when the pins arrive at the top of the ramp they are fed directly into the delivery tube 32 axially of the tube and are not fed to the tube in a random orientation such that blockage of the tube by pins lying across the tube could occur. The delivery tube 32, which is preferably made of plastic or glass, includes a circular metal ring 33 disposed about the exterior periphery of the tube to prevent a buildup of static electricity which could in turn cause delivery problems of the pins as they feed into and through the tube to the loading hopper. The metal ring also serves to dampen excessive vibration on the tube contributed by the pin feeding system.

From the delivery tube 32, the pins move to the hopper 34 which includes a plurality of loading slots or bins. If the pin insertion head is designed to insert a cluster of seven pins into a circuit board, the loading mechanism will then include seven slots or bins in the hopper, or one slot or bin for each pin in a cluster. The pins are gravity fed from the tube to the loading bins in the hopper. The pins remain in alignment as they are fed into the respective bins. As one bin fills up, the remaining pins spill over into the adjacent bin. This procedure is continued until the bins are relatively full of pins or until a state of equilibrium is reached with respect to the supply of pins being fed into the loading mechanism and the number of pins being inserted into a circuit board. Vibratory action is used to aid movement of the pins into the slots or bins of each hopper. The pins are loaded into an insertion head by pneumatic action of a loader 36 which is in turn controlled by the sequential action of the pin insertion apparatus.

The pin feeding apparatus, including the main bowl feeder and the loaders, includes a control panel, shown obliquely in FIG. 1, and shown in detail in FIG. 2.

The actual pinning of a circuit board is accomplished by the cooperative action of the three primary systems, the pin feeder and loader system, the pin insertion head system, and the table movement system. The three systems are in turn coordinated and controlled by a fourth system, a control system. The control system includes the required electrical circuitry and apparatus, including the photosensor systems, for controlling movement of the table, the loaders, and the insertion heads. The control system also includes a valve system for controlling an air supply for pneumatically actuating the loaders and a valve system for controlling an air supply for pneumatically actuating the rams which in turn move the pin insertion heads.

FIG. 2 comprises a view of the controls for the pin feeding apparatus, including the main bowl and the loader. Since the apparatus of FIG. 1 is shown as having dual circuit boards for dual pin insertion heads, and therefore dual feeders, the control panel for the pin feeding apparatus of FIG. 1 accordingly includes dual controls. A master switch 40 is provided which controls the power to the pin feeding system. The master switch is preferably a three position switch, including positions for off, auto, and on. Its function will be described below. A pair of switches 42 and 43 control power to the main bowl feeders. A pair of potentiometers 44 and 45 is provided for controlling the vibratory action of the feeders. Another pair of switches 46 and 47 controls power for the vibrators on the loading hoppers. A pair of potentiometers 48 and 49 is also provided for varying the vibration at the loading bins. Another pair of switches 50 and 51 turns the air pressure for operating the loaders on or off. The switches 50 and 51 are on-off toggle switches, as are switches 46 and 47, and 42 and 43.

In order to operate the pin feeding system, the master switch is first moved from the off position to either the on position or the auto position. The respective switches for either of the feeding systems must then be actuated from the off position to the on position, including the air cut off switches 50 and 51. The potentiometers 44 and 45 and 48 and 49 may be individually adjusted to provide the proper vibratory rate for loading the pins.

With the master switch in the on position, both feeder systems will be actuated according to the position of the respective power switches for the bowl feeders and for the hopper vibrators. With the master switch in the auto position, the feeding systems will be in operation when the respective insertion heads are functioning according to the pin insertion cycle taking place. Accordingly, when a board has been completed or when the apparatus shuts down for any reason, the pin feeder system will also shut down.

FIG. 3 comprises an isometric front view of the apparatus of FIG. 1. Lower support frame 1 is shown with the platform or table 6 resting thereon, and both are shown surmounted by the upper support frame or bridge structure. A pair of pin insertion head systems 10 and 11 depend from the horizontal cross membpr 4 of the upper support U frame behind front panel 12. Alignment and guidance for the pin insertion head systems is provided by guide yokes 204. Front panel 12 extends between end posts 2 and 3 and downwardly from cross member 4. The panel includes a plurality of switches and indicator lights for controlling the insertion heads, the loaders, and the direction of movement of the X and Y drive units. The switches on the panel will be discussed in detail in conjunction with FIG. 4. A pair of emergency stop control switches 9 are included on the front panel 12. The emergency stop switches 9, on both the front panel 12 and the back panel 8, comprise a safety feature for disconnecting power to the apparatus by depressing any of the four switches. Power junction box 5 is shown on the end post 3 of the U frame.

Both the X and the Y drive units, with some of their associated drive and control structure and apparatus, are shown in FIG. 3. The Y drive unit 14 is shown in substantially its full "out" position. The Y drive unit is supported by, and is movable on, a pair of parallel guide rods 15. The guide rods are supported in blocks 60 at each end thereof. A front cross brace 62 extends between a pair of end rails 64 and 66. The end rails and the front cross brace and a back or rear cross brace (see FIG. 5) comprise the Y table carriage frame. The end rail 64 is connected to, and extends above, respective ends of the cross braces adjacent end post 2. It includes on its bottom or underneath side a rack which meshes with a pinion gear connected to and driven by a Y drive motor 68.

A grid index 74 is located on the top of end rail 64, and it cooperates with a grid pointer 75 which is secured to upper support assembly 4 and with an index disc driven by the motor 68. The grid index and the grid pointer apparatus are used to align the table, and the work pieces thereon, to the insertion heads with respect to the photoelectric stops. Their function is primarily concerned with the movement of a table resulting from a power failure. For example, if a power failure occurs while a table is moving, when power is restored the table will be off grid and thus will not be in a proper position to receive a cluster of pins from the pin insertion heads. It is therefore necessary to align the table manually with reference to the grid index and the grid pointer apparatus.

The end rail 66, at the opposite end of the cross braces from end rail 64, and adjacent end post 3, is of a slightly different configuration than the end rail 64. This is necessitated by the Y photosensor system, including the photosensor 16 and the Y punched metal strip 17. The punched metal strip 17 is secured to the upper or top portion of end rail 66 by a pair of screws extending through a pair of elongated slots. As with the X strip and X photosensor, the Y strip 17 may be adjusted on the end wall by loosening the screws and by moving a thumb screw 23 which is a vernier or micrometer screw connected to both the Y table carriage frame and the Y strip.

Underneath the end rail 66 is a rack which corresponds to that disposed beneath end rail 66. A drive shaft 69 extends from Y drive motor beneath the table 80 for driving the table and the carriage frame in the Y direction. A pair of pinion gears is secured to the shaft 69, one of which meshes with and drives the rack secured to end rail 64. At the distal end of shaft 69 is another pinion gear which meshes with and drives the rack supported beneath end rail 66. The shaft 69 rotates according to the rotation of motor 68, which is a stepping motor, to incrementally advance the Y table 14. The distance the table moves in the Y direction is determined by the photosensor system 16 which is in turn controlled or programmed according to the punched metal strip 17.

To reduce backlash of the Y carriage frame and the table, the gears which mesh with the racks underneath the end rails are offset slightly from each other such that gear teeth of both gears are at all times in contact with matching or meshing teeth of the racks. For example, the forward face of a particular pinion gear may be in contact with the matching face of a rack while the rear face of the opposite gear may be in contact with the matching face of the opposite rack. In this manner skew is eliminated and the table moves incrementally and positively with each finite movement of the Y drive motor 68 and its drive shaft 69.

The X drive unit 18 is movable on, and supported by, the Y carriage frame. A pair of parallel X guide rods 19 extend between, and are secured to, the end rails 64 and 66, and the X drive unit 18 is movable on the guide rails. The X drive unit includes a platform or table 80 which provides support for a pair of circuit boards 86. Appropriate locating or indexing and fastening means are used to secure the circuit boards to the table 80. The table is disposed and supported on a rectangular table frame 81. The frame is in turn secured to bearing blocks 82. Within each bearing block is a bearing 83 which provides the bearing surface for the X drive unit on the guide rails 19. The guide rails extend through the bearings and bearing blocks and the table frame, and table, move on the rails.

The drive system for the X direction of movement is substantially the same as that for the Y drive unit. A stepping motor 88 drives a shaft to which is secured a pinion gear which in turn meshes with a rack secured to the underneath or bottom side of frame 81 of the table. With the X drive unit there is no need for the double gear and rack system used with the Y drive unit. The Y table carriage frame rack and pinion system prevents skew and obviates any cocking of the table. Movement in the X direction is less critical than movement in the Y direction because each pin cluster from the pin insertion head is oriented parallel to the X axis of movement.

The photosensor system for the X drive unit, including the X photosensor 20 and the X punched metal strip 21, with its program of punched holes, controls the movement of the stepping motor 88 which in turn drives the table in the X direction.

FIG. 4 comprises an enlarged broken view of a portion of FIG. 3, and shows some of the control switches and indicator lights associated with the apparatus. Front panel 12 includes a switch 90 which connects electrical power to the cluster pin insertion apparatus. An indicator light 91 is associated with the switch 90 and is illuminated (or "on") when power is on the apparatus.

A two-position toggle switch 92 is a selector switch to control the mode of operation of the apparatus. In one position the apparatus is operating in the auto mode in which each pinning operation is accomplished sequentially from the insertion of the first cluster of pins into a board until the board has been completely pinned. A second mode of operation which may be selected is referred to as a jog mode. The jog mode is also an automatic mode except that only a single pinning cycle is accomplished. The apparatus thus "jogs" through a cycle of operation. The events of each cycle follow sequentially but the apparatus turns off when a single cycle has been completed rather than continuing with following cycles as in the auto mode. The second or "jog" position selected by switch 92 is also used for the manual mode, when each sequential step or operation in a pinning cycle must be selectively accomplished by manual operation.

Switch 94 is a cycle start switch which is used to begin a pinning cycle in the auto mode. During operation in the auto mode, indicator light 95 is illuminated. When a board has been completed, or when the apparatus shuts down for any reason, the cycle start switch will automatically be released or opened and the indicator light will go off.

Manual control of the pin insertion heads and their respective loaders is accomplished by switches 96 and 98. Each of the switches is a three-position switch spring loaded to the off position. Switch 96 controls movement of the pin insertion heads. Movement of the switch in one direction or to one position moves the head up and movement of the switch to the opposite direction or position moves the heads down. Switch 98 is used to move the loaders. Movement of the switch to one position moves the loaders back and movement of the switch to the opposite position moves the loaders in.

Switch 100 is also a three-position switch which allows switches 96 and 98 to be selectively used with only one or the other of the heads. In one position of switch 100, only one head or one loader will move, and in the second position the other head or loader will move when switches 96 or 98 are manually positioned. In the off position of switch 100, both heads or loaders move as switches 96 or 98 are actuated.

Switch 104 is a manual drive switch for the X drive unit. Depressing switch 104 connects the X drive motor directly to a power source to move the table as desired in an X direction.

Switch 106 is used to manually change the direction of drive of the X drive unit from "left" to "right" and vice versa. If the table is moving one way in an X direction, momentarily depressing switch 106 will reverse the direction. Each time the switch is depressed the direction will change.

Indicator lights 104 and 106 are used to indicate the direction of travel of the X drive unit. When the table is moving in an X direction, one of the indicator lights will be on.

Switches 110 and 112 manually control the drive and the direction of drive, respectively, for the Y drive unit. Depressing switch 110 manually moves the table in a Y direction. Depressing switch 112 changes the direction of drive of the Y drive unit.

Indicator lights 111 and 113 indicate the direction of drive of the Y drive unit.

Indicator lights 102 and 108 are warning lights which will be on when any light source in the X or Y photosensor systems, respectively, is out.

Grid set switch 114 is used to disconnect the table drive systems in order to manually position the table to the proper grid position, as discussed above in conjunction with grid index 80 and grid pointer 81 of FIG. 3. If movement of the table were interrupted, as by an electrical failure, when the table had nearly completed its move, momentarily pressing and releasing the grid set switch will cause the table drive system to complete its move to the proper indexed position of a table. However, if the movement of the table was interrupted early in the movement cycle, then the table must be positioned manually according to the appropriate grid index and pointer. During this manual move, the grid set switch 114 must be depressed to disconnect the drive system from the table.

A pair of switches 116 and 118 are used to control the air pressure for the pin insertion heads. The pin insertion heads are pneumatically operated and the switches accordingly control the air pressure, on or off, to the respective head to which they pertain.

Figure 5:
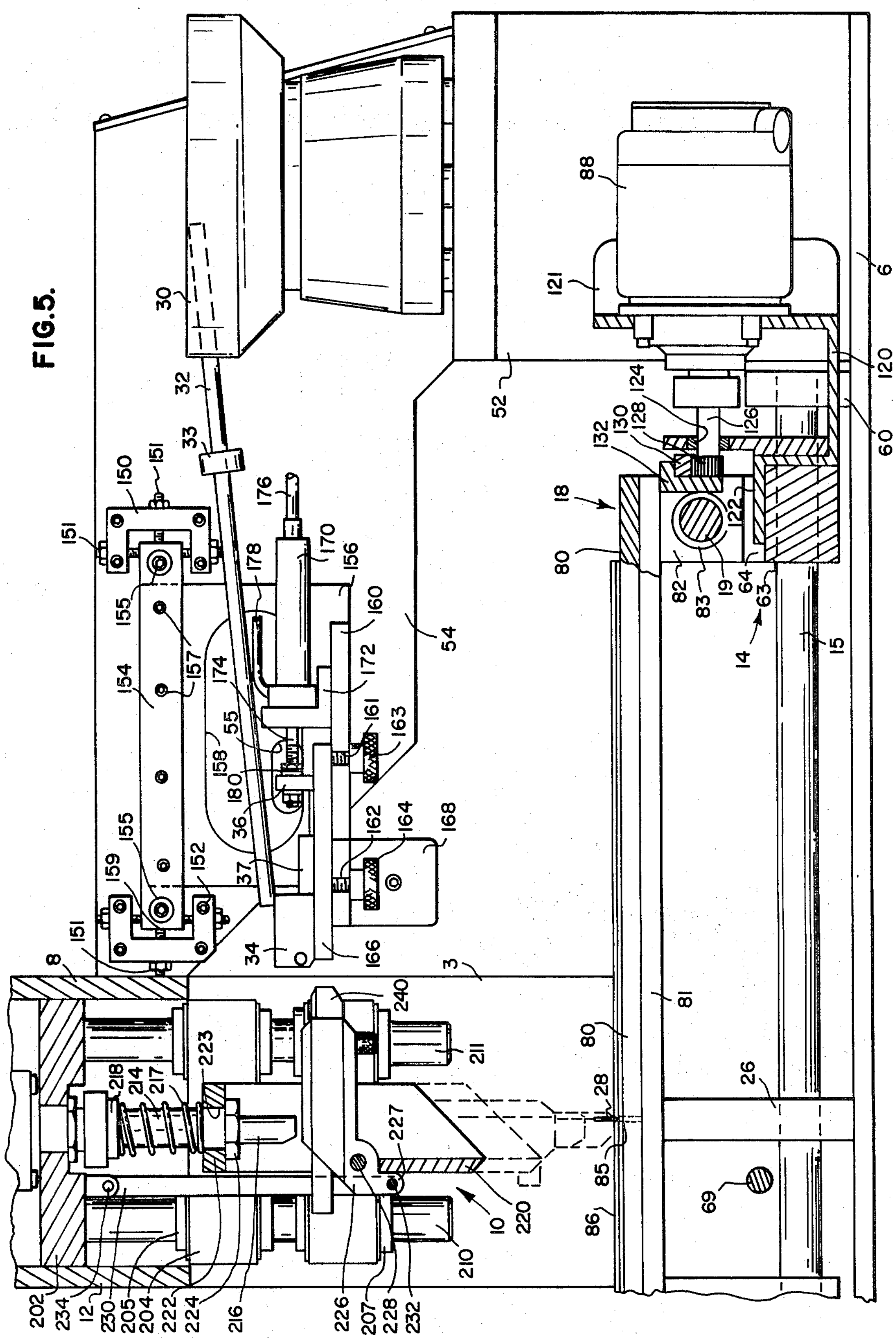
FIG. 5 is a sectional view taken along line 5—5 of FIG. 3.

FIG. 5 is a sectional view showing the X and Y drive units, the X motor, and the bowl and pin feeding apparatus in relation to a pin insertion head. The table or platform 6 provides support for structural housing 52 which is surmounted by, and in turn provides structural support for, main bowl feeder 30 and for a support plate 54. Support plate 54 provides support for the pin loading mechanism, such as loading hopper 34, loader 36, and pneumatic actuator 170 required for moving loader 36 "in" and "back." Delivery tube 32 extends from main bowl feeder 30 to loading hopper 34. Magnet 33 is positioned along delivery tube 32, as previously indicated, to prevent the buildup of static electricity on the tube.

Y drive unit 14 is shown in its full "in" position. With the Y drive unit full in, the circuit board 86 is in position to receive the last row of pins. The Y drive unit is supported by, and is journaled for axial movement along, a pair of guide rods 15, one of which is shown in FIG. 5. The guide rods extend through a pair of end rails 64 and 66 (see FIG. 3). A portion of end rail 64 is shown in FIG. 5. Rear cross brace 63 is in turn secured to the end rails.

A pair of guide rods 19 are secured to the Y drive unit end rails. X drive unit 18 moves on the guide rails 19. The X drive unit includes a platform or table 80 surmounting a frame 81. At each corner of the rectangularly configured table frame 81 is a downwardly depending bearing block 82. Each bearing block includes a bearing 83 through which guide rods 19 extend. Thus the X drive unit 18 is journaled for axial movement along the guide rods 19. The table platform 80 provides support for circuit board 86, which is appropriately secured to the table.

A support block or anvil 26 is secured to platform 6 beneath head 10. Drive shaft 69 for the Y motor is adjacent anvil 26. The anvil 26 provides support for the table 80 and for the circuit board 86 as the pin insertion head and its ram moves downwardly to insert the pin clusters into and through the circuit board. Since the pins are inserted into and through the circuit boards, the X table or platform 80 includes a plurality of holes which correspond to the configuration of the holes in the circuit board. While the several individual holes are not shown in FIG. 5, a single pin 28 is shown inserted into the circuit board 86 and extending below the board into a hole 85 in the platform 80. If desired, the X table platform 80 may include several pinning patterns. With a plurality of punched metal strips for the X and Y photosensor systems, virtually any desired pinning configuration may be employed with the present pin insertion apparatus.

The X drive motor 88 is secured by a motor support bracket 120 to cross member 62 of the Y table. The bracket 120 includes support for the motor 88 and also includes a bearing 124 which supports motor drive shaft 126. Bracket 120 has a generally U-shaped configuration, with an arm of the "U" which includes bearing 124 secured to an angle bracket 122. The angle brakcet 122 is in turn secured to rear cross brace 63 of the Y table 18. The other arm of the "U" is fastened to motor 88 and includes a pair of side flanges 121. The flanges 121 extend from bracket 120 parallel to the axis of the motor and provide additional strength to the bracket.

Support plate 54 extends from support structure 52 to back panel 8 intermediate end post 2 and end post 3 (see FIG. 1). The plate 54 provides support for the loader 36, loading hopper 34, and pneumatic actuator 170. If a pair of pin insertion heads, with a pair of loaders, bowl feeders and the like, are desired, then a pair of plates 54 may be spaced apart between support structure 52 and back panel 8, with one plate used as support for one loader and hopper, and the other plate used for the other loader and hopper.

Since registry of the loader to the head is important in the loading cycle, it is important to have the ability to adjust the loader in three directions, up and down, in and out (or to and from the head), and sideways (left to right). Movement sideways is not as critical as movement in the other directions because there is enough flexibility in the pins to be guided slightly sideways into the receiving apertures or slots in the insertion heads in order to compensate for very slight sideways adjustments. However, alignment is more critical with respect to the vertical direction to maintain the pins parallel to the head as they are inserted. It is also necessary to maintain the proper distance between the head and the loader in order to properly seat the pins in the head and to allow clearance between the pins and the loader as the head pivots away from the loader in its downward movement. Moreover, it may be necessary to make a pivotal or angular adjustment to obtain correct alignment.

To support and align the loading apparatus, including a loader 36 and a hopper 34, a bar 154 is secured to plate 54 by a pair of bolts 155 which extend through the bar at its opposite ends. A plate 156 is in turn secured at its upper portion to the bar by a plurality of appropriate fasteners, such as bolts 157. The plate 156 includes a central relieved area which defines a large aperture 158. The area of the plate around the aperture includes an upper portion adjacent bar 154, a lower portion, and a pair of webs connecting the two portions. The relieved area lightens the weight of the plate 156 and permits the remaining portions or area of the plate, particularly the webs between the upper and lower portions of the plate, to be free to vibrate and to act as a shock absorber. The overall length of plate 156 is less than that of bar 154 to which it is secured.

A bracket or plate 160 is secured to the lower portion of plate 156 to provide support for the loading apparatus. Bracket 160 includes a pair of slots 161 and 162. Base plate 166, which comprises the base for the loader 36, the loader guide block 37, and loading hopper 34, is supported by bracket 160 and is locked in place thereon by a pair of knurled nuts 163 and 164 which are received by the slots 161 and 162, respectively. A guide bar (not shown), adjustable in the X axis, is disposed on the plate 166 adjacent the loader, the guide block, and the hopper. Vibrator 168 is secured to the underneath side of bracket 160. The vibrator provides a vibratory motion for the pins in the loading hopper 34. Within the hopper 34 is a plurality of loading bins which receive pins through delivery tube 32 from main bowl feeder 30. The pins enter the loading hopper 34 are are distributed to the various bins or slots within the hopper by the vibratory action of vibrator 168.

A pneumatic actuator 170 is secured to bracket 160 by an angle bracket 172. The pneumatic actuator 170 provides the motive force for moving loader 36 by means of piston rod 174. The piston rod is secured to a piston within the actuator 170. A "loader in" air line 176 provides pressurized air to move the piston within the actuator and in turn to move the loader 36 to the "in" position. A "loader back" air line 178 provides pressurized air to move loader 36 back by pressurizing the opposite side of the piston within the actuator 170 to move the loader back.

Limit switch actuator 180 is secured to loader 36 at piston rod 174. The limit switch actuator comprises a blade which moves with the loader in response to movement of the piston rod 74. It moves between a pair of limit switches, not shown, which may preferably be secured to support plate 54 on the opposite side from the loading apparatus. The actuator extends through the aperture 158 of plate 156 and through an aperture 55 in plate 54. When an appropriate control signal actuates a solenoid valve to permit pressurized air through line 176 to move loader 36 "in," the movement of the loader "in" in response to movement of piston rod 174 also moves limit switch actuator 180. Another control signal actuates a solenoid valve to provide pressurized air through line 178 to move the loader back, the return movement of the loader also moves limit switch actuator 180 with it. Specific operation of the control system and the limit switches will be discussed below.

Loader 36 and loading hopper 34 are supported by block 166 on bracket 160. The loader extends through a guide block 37 beneath loading hopper 34. The specific operation of the loader will be discussed in detail below.

As previously indicated, the orientation of the loader to the head requires alignment in three axes, which may be referred to as the Y axis, or in and back, parallel to the movement of the loader; the Z axis or up and down; and the X axis, sideways or laterally left and right. As also previously indicated, the orientation of the loader to the head laterally is less critical than the orientation of the loader to the head in both the Y and Z axes, or in and back and up and down. The orientation of the loading apparatus is accomplished by C brackets 150 and 152 and the bar 154, to which is secured plate 156 and the loading apparatus. The position of the C brackets with respect to support plate 54 is fixed since the C brackets are secured directly to the support plate 54. The C brackets support bar 154 and provide adjustment in both the Y and the Z axis through a plurality of adjustable screws 151. Bolts 155 extend through oversized or elongated apertures in plate 54 to allow for any desired adjustments in the positioning or orientation of bar 154 with respect to plate 54 and to C brackets 150 and 152.

Movement of bar 154 in the Y and Z axes may be accomplished by adjustment of the screws 151. The screws extend through drilled and tapped holes in C brackets 150 and 152 and are locked in place by appropriate lock nuts. As an adjustment in the position of bar 154 is required, bolts 155 are loosened and the lock nuts for the screws 151 are loosened. The screws are then adjusted to position bar 154, and the loading apparatus secured thereto, as desired. The lock nuts and the bolts 155 are then retightened.

The end of bar 154 closest or nearest to the panel 8 includes a recess into which a compression spring 159 is located. A screw 151 is tightened against the spring and serves to bias the spring. At the opposite end of bar 154, the screw 151 is snugged and locked against the end of the bar. The use of the compression spring provides a means of loaded force adjustment for the bar 154 and the plate 156 and the loading apparatus secured thereto as the loader moves in and back and as the vibrator 168 vibrates the loading apparatus and particularly the hopper 34 and the pins therein.

Orientation of the loading apparatus in the X direction is accomplished by a guide bar on the plate 66, as indicated above. The slots 161 and 162 allow the loading apparatus to be oriented and secured to plate 66 as required.

Pin insertion head apparatus 10 is secured to a structural support member 202 which extends between back panel 8 and front panel 12. The pin insertion apparatus includes a guide yoke 204 which includes a pair of upper bushings 205 and a pair of lower bushings 207. The guide yoke moves on a pair of parallel guide rods 210 and 211 which are secured to structural support member 202. The guide yoke and rods provide alignment as the pin insertion apparatus moves up and down. Guide yoke 204 is in the configuration of a block "H" disposed in a horizontal position, with the upper and lower bushings comprising the arms of the H and with a connecting cross member (see FIG. 3) extending between the upper and lower bushings. A pneumatically operated actuator provides power to move the pin insertion apparatus. The actuator includes a piston rod 214 which moves vertically up and down. Secured to the piston rod is a ram 216. The piston rod 214 includes internal threads to which the ram is secured and external threads to secure the ram and the piston rod to a guide housing 220. The guide housing 220 is shown with a side cover removed in order to show the orientation of the cluster pin flip head 240 and to show the piston rod and ram secured to the housing. The housing is secured to the guide yoke. Piston rod 214 extends through an aperture 223 in housing top plate 222. The aperture is slightly larger than the diameter of the piston rod 214 so as to allow the piston rod to move freely therein. Concentric with the internal threads in the piston rod 214 that are used to secure the ram to the piston rod, there are external threads on the piston rod and a nut 224 is threaded thereon. The nut 224 is of a diameter greater than aperture 223.

Above housing top plate 222, and disposed about piston rod 214, is a compression spring 217. The compression spring extends between the housing top plate 222 and a nut 218 on the piston rod 214.

Piston rod 214 moves downwardly and spring 217 bears against top plate 222 to move the pin insertion apparatus also in a downwardly direction. The pin insertion apparatus, including the guide housing 220 and the cluster pin flip head 240, moves downwardly on guide yoke 204. When the pin insertion head apparatus is in the "up" position, cluster pin flip head 240 is aligned with the loading apparatus to receive pins. After the pins have been inserted into the flip head and the insertion head apparatus moves downwardly, the flip head swings through an arc of 90° during the downward move. The flip head 240 swings or pivots while guide housing 220 stays in alignment. Guide housing 220 is secured to yoke 204 and is accordingly guided and moved downwardly.

A trapeze harness 226 is secured to flip head 240. The head 240 and the trapeze harness pivot about a pivot pin 228 which extends through, and is connected to, housing 220, to move the head from alignment with the loader to alignment with holes in the circuit board 86. Trapeze harness 226 includes an offset portion 227, which extends at 90° from, or is perpendicular to, the axis of the pins in the flip head 240. In other words, the offset portion is at right angles to the alignment of the head. A pivot pin 232 extends through the offset portion 227 and a pair of trapeze straps 230 extend from the pin 232 to a pin 234 secured to structural support member 202. As the pin insertion apparatus moves downwardly, the flip head 240 and the trapeze harness 226 pivot about pin 228 to move the flip head into alignment perpendicular to circuit board 86. The trapeze straps 230 prevent vertical movement of the flip head and they allow the head to pivot about pin 228, while the straps describe an arc from pin 234 about pin 232.

After the head has flipped 90° into position for inserting pins into the circuit board, the piston rod and ram continue their downward movement until the head is against the circuit board, with the pins extending into the circuit board. At this time the head has reached the limit of its travel and the ram continues to descend through aperture 223. This results in the compression of spring 217 as the ram inserts the pins into the circuit board through push rods carried in the flip head. Details of the pin insertion head, including the push rods and the ram, will be given below.

When the actuator moves the piston rod and ram upwardly, nut 224 contacts the housing top plate 222 and thus moves the housing and the cluster pin flip head upwardly. As the housing and head move upwardly, the head again pivots on pivot pin 228 by the action of the trapeze straps 230 to "flip" the head into the up position in alignment with the loader where the head receives a new cluster of pins.

Figure 6:
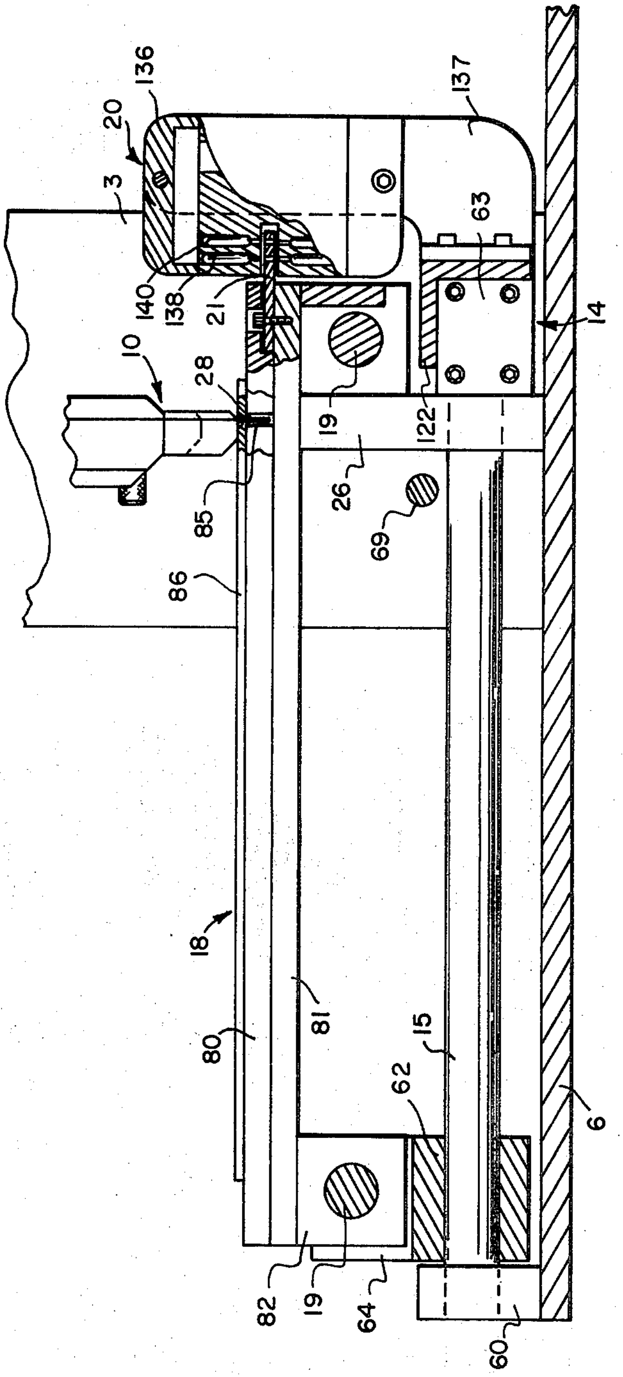
FIG. 6 is a sectional view taken along line 6—6 of FIG. 3.

FIG. 6 is a sectional view similar to that of FIG. 5, but includes details of the X drive photosensor system 20 and the X drive unit punched metal strip 21.

A support block 60 for Y drive unit guide rod 15 is shown disposed on and supported by platform 6. With the table 80 shown in the full "out" position, front cross brace 62 and end rail 64 are disposed adjacent front support block 60.

X drive unit 18 moves on a pair of guide rails 19, and is supported thereon by a pair of bearing blocks 82 to which the table frame 81 is secured. The table or platform 80 is disposed on the frame 81.

Pin insertion head apparatus 10 is shown in the down position with a pin 28 extending into circuit board 86 and into a hole 85 in the table 80. The table 80 is supported against the force of the pin insertion head by anvil 26.

The photo sensor system for the X drive unit includes photo sensor 20 with its photo cells and light sources, and a punched metal strip 21. The punched metal strip 21 is secured to, and moves with, the X drive unit 18. As previously indicated, the strip includes a number of holes or apertures punched or drilled therethrough. The holes are aligned in two parallel rows. One row includes the limit holes and the other row includes the stop holes which control the incremental movement of the table in the Y direction. The limit holes, one at either end or limit of travel of the X drive unit, signal, through the photo sensor system, that a limit of travel has been reached and accordingly the Y drive unit should make a move before another X move is made.

The photo sensor system includes a housing 136 which is secured to Y drive unit 14 by bracket 137. The bracket 137 is secured through angle bracket 122 to rear cross brace 63.

Within housing 136 is a pair of X photo cells and a pair of light sources, and electrical circuitry as required. X limit light source 138 is disposed above its photo cell, and X stop light source 140 is disposed above its photo cell. The punched metal strip 21 extends into housing 136 between the respective light sources and their photo cells. When a hole in the strip is in registry with a light source and its photo cell, a signal is sent to an appropriate amplifier which in turn signals the X motor to stop.

Figure 7:
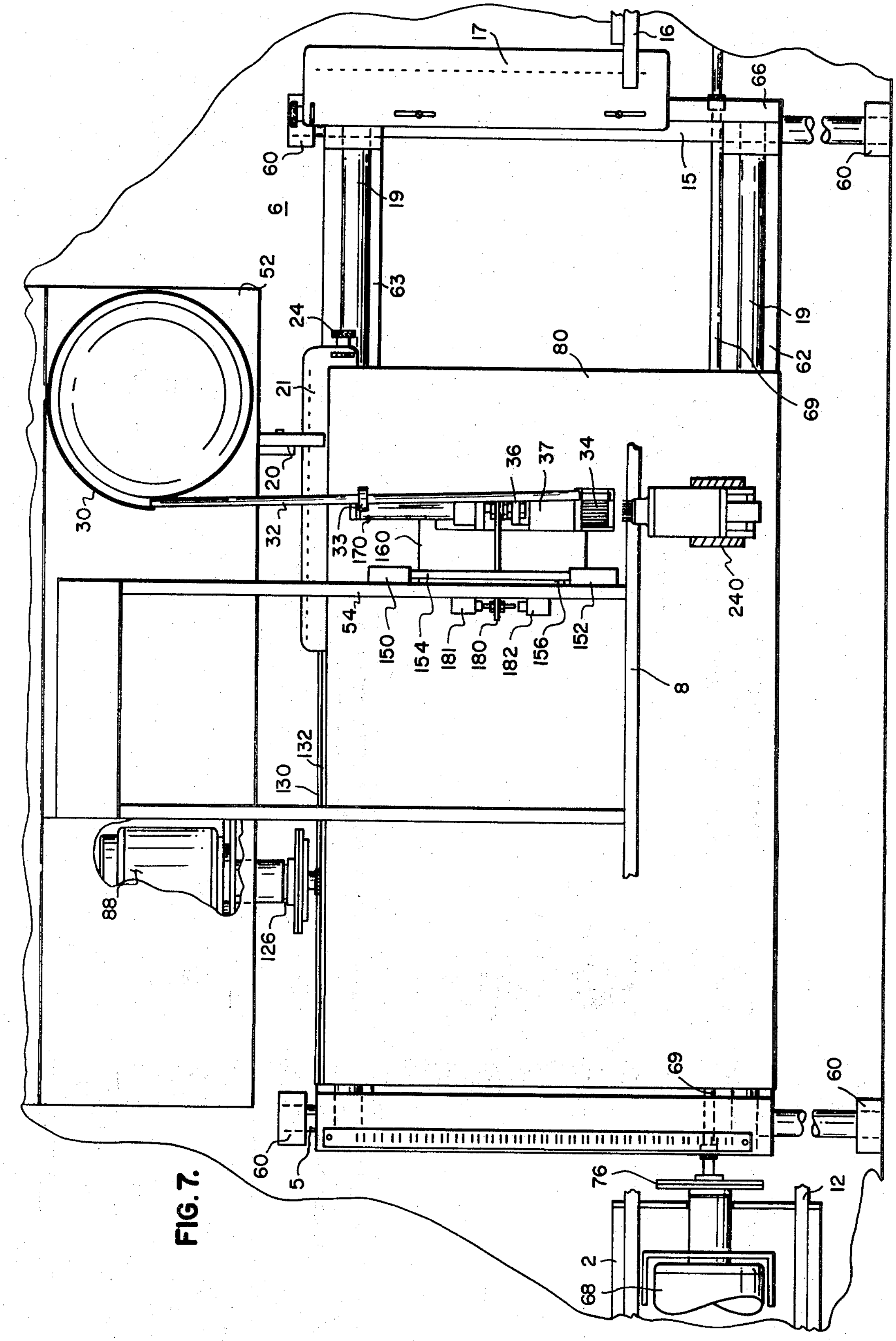
FIG. 7 is a plan view in partial section taken along line 7—7 of FIG. 3.

FIG. 7 is a plan view in partial section of the pin insertion apparatus taken along line 7—7 of FIG. 3. The cross member for the upper support frame or bridge structure has been removed, and end post 3 has been cut away. End post 2 is shown with back panel 8 and front panel 12 shown connected thereto. Support structure 52 is disposed on the platform or table 6 and support plate 54 extends from the support structure 52 to back panel 8. Main bowl feeder 30 is disposed on support structure 52 and delivery tube 32 extends from the bowl feeder to loading hopper 34.

Loading hopper 34, and loader 36 and guide block 37, are all disposed on a bracket 160 which is in turn secured to bar 154. Bar 154 is secured to both support plate 54 and a pair of C brackets 150 and 152. The brackets 150 and 152 are also secured to and supported by plate 54. The bar 154 is oriented with respect to the C brackets by a plurality of bolts. Plate 156 is connected to both bar 154 and bracket 160. Accordingly, the positioning or orienting of bar 154 also orients bracket 160 and the loading apparatus disposed on bracket 160 is aligned to the head for insertion of pins into the head.

Pneumatic actuator 170, which moves the loader 36, also moves a limit switch blade 180. The limit switch blade 180 extends through a pair of apertures, one in plate 156 and the other in support plate 54, and moves between a pair of limit switches 181 and 182. The limit switches are both secured to support plate 54. As the loader moves "in" by action of the pneumatic actuator 170 to insert a cluster of pins into the head 240, the limit switch blade 180 moves forward and closes the contacts on limit switch 182, which is the "in" limit switch. As the loader moves back, the limit switch blade 180 moves away from limit switch 182 which allows the contacts therein to open. As the loader moves to its "back" position, the limit switch blade 180 closes the contacts of the back limit switch 181.

Table 80 moves beneath the loading apparatus and beneath the pin insertion head. The table moves in the Y direction on a pair of guide rods 15 which are each supported on a pair of support blocks 60 at the ends of the rods. Y drive motor 68 moves the table in the Y direction by a pair of pinion gears which mesh with a pair of racks disposed under the end rails of the Y drive unit. Shaft 69 is driven by the Y drive motor 68 and the pinion gears are secured to the shaft. Grid index disc 76 is also secured to and moves with shaft 69. The grid index disc, and its associated apparatus, will be discussed in detail in conjunction with FIG. 8.

Incremental movement of the table in the Y direction is controlled by a photo system sensor which includes a photo sensor 16 and a punched metal strip 17. The punched metal strip is secured to end rail 66 of the Y drive unit.

Table 80 moves in the X direction on a pair of guide rails 19 which extend between the end rails of the Y drive unit. Power to drive the table in the X direction is provided by X drive motor 88, which is coupled to the table through a shaft 126 and a rack and pinion gearing system. The rack 130 is secured to a support bracket 132 which is in turn secured to the X drive unit and to the table. As the motor 88 turns shaft 126, a pinion gear meshes with rack 130 to move the table 80 in an X direction.

Incremental movement of the table in an X direction is controlled by a photo sensor system which includes a photo sensor 20 and a punched metal strip 21. Punched metal strip 21 may be adjusted with respect to the table and to the photo sensor 20 by loosening a pair of bolts and by adjusting vernier thumb screw 24.

Figure 8:
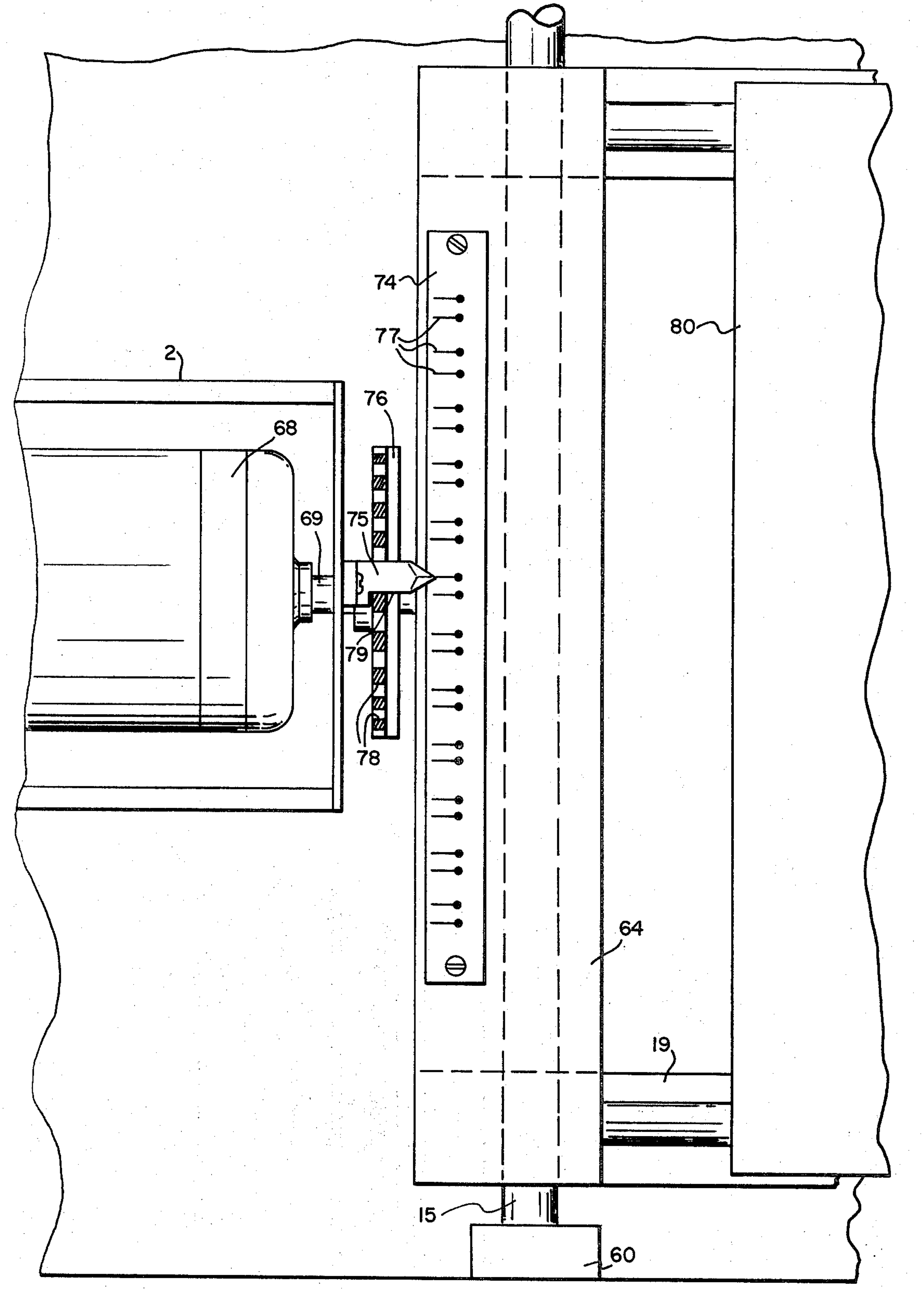
FIG. 8 is an enlarged fragmentary plan view of a portion of the apparatus of FIG. 7.

The grid index apparatus is shown in FIG. 8, which is a plan view of a part of the Y drive unit. Precise alignment of the table 80, and of a circuit board disposed on and secured to the table, is accomplished through the photo sensor systems, comprising the pair of punched metal strips and the photo sensors. As previously discussed, the punched metal strips include both stop holes and limit holes. When the photo cells in the photo sensors receive a light signal from a light source through a hole in the punched metal strips, a signal is sent which in turn stops or turns off the X or the Y drive motor. However, if a power failure should occur while the Y drive motor 68 is on, when power is restored the table 80 will not be aligned properly on the pin insertion hole grid on the circuit board. Accordingly, a system is required to show the operator the location of the table with respect to the proper grid so that alignment to the grid may be accomplished manually. This is the function of the grid index system.

Grid index 74 on end rail 64 cooperates with the grid pointer 75 supported on end post 2 and grid index 76 secured to, and rotatable with, shaft 69. Scale index marks 77 and 78 on the grid index disc 76, respectively, are aligned by the grid point 75. When the marks are aligned by the grid index pointer 75 on both grid index 74 and grid index disc 76, the table is on the proper grid and the circuit board is accordingly oriented properly for the next move in the Y direction.

If desired, the marks 77 and 76 on the index and the disc may be color coded for easier identification, for example, the index pointer 75 may be aligned with a mark on the grid index 74 which may be color coded blue or black or any desired color. To be on grid, notched side 79 of the index pointer 75 should be aligned with a mark and only a blue or black portion of the disc 76 should be in view adjacent the notched side. After the next Y move, the pointer may be aligned with a mark without a color (or with only the normal metallic color), and the notched side should be aligned with a mark with the adjacent portion of the disc matching the color (or absence of color) of the index under the pointer.

If it is required to manually move table 80 to align the marks, the grid set switch 114 (see FIG. 4) must be depressed to disconnect the drive motors from the table.

Figure 9:
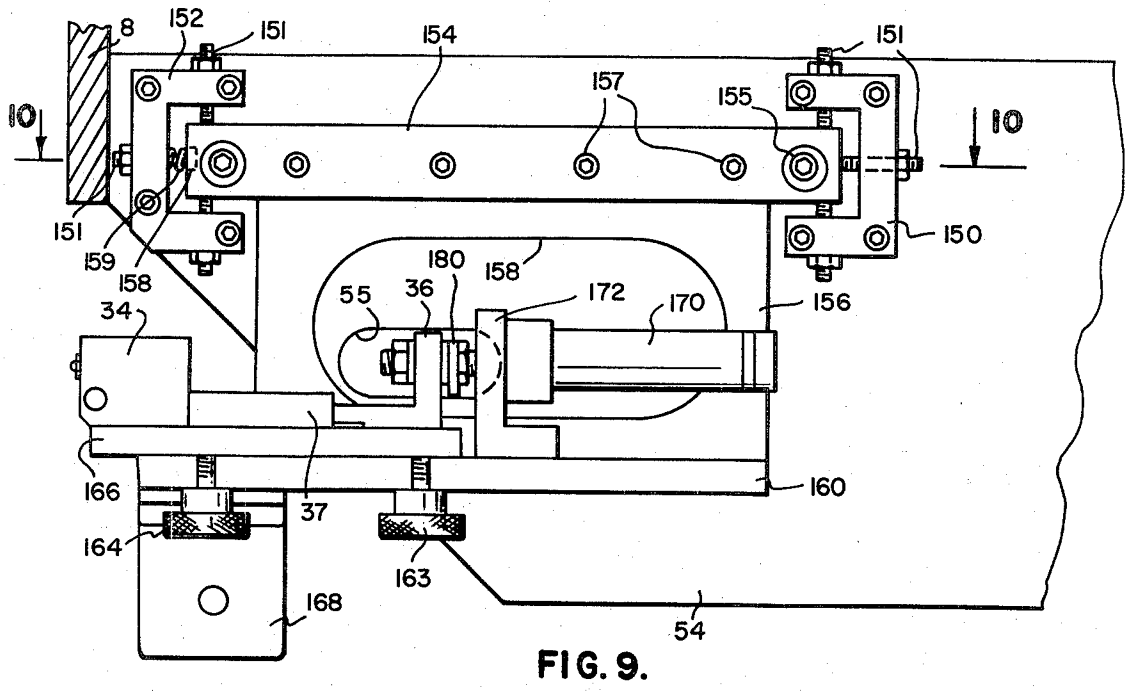
FIG. 9 is an enlarged view of a portion of the apparatus of FIG. 5.

FIG. 9 is an enlarged view of a portion of the apparatus of FIG. 5, specifically showing the loading apparatus and the loader adjustment or orientation structure. Support plate 54 is secured to back panel 8, and C brackets 150 and 152 are secured to the support plate 54 by appropriate fastening means, such as screws. The loading apparatus, including loading hopper 34, loader 36, and loader guide block 37, is disposed on and secured to a bracket 160 by a pair of knurled nuts 163 and 164. A pneumatic actuator 170 is secured to bracket 160 by an angle bracket 172. The pneumatic actuator provides the force or the energy for moving the loader 36. Limit switch blade 180 is secured to the loader and moves with it.

Vibrator 168 is fastened to bracket 160 on its underneath or bottom side and is disposed generally beneath loading hopper 34. The vibrator provides vibratory action for the loading hopper 34 to aid in the distribution of pins within the loading hopper.

Bracket 160 is in turn secured to support plate 54 through a plate 156 and a bar 154. The bracket 160 is secured to the lower portion of plate 156 and the bar 154 is secured to plate 156 at its upper portion. Appropriate fasteners, such as a plurality of screws 157, may typically be used to secure plate 156 to bar 154. Bar 154 is oriented with respect to support plate 54 by C brackets 150 and 152, and the bar is then secured to the support plate by a pair of bolts 155. Bolts 155 extend through enlarged apertures in the bar to allow for orientation of the bar by the C brackets as desired.

The C brackets are in the configuration of a block "C" or a block "U" tilted on a side, with a pair of relatively short arm members extending from a relatively longer vertical cross piece member. Each arm includes a drilled and tapped hole extending through the arm into which a screw 151 is inserted. Similarly, the cross piece includes a drilled and tapped hole extending through the cross piece into which a screw 151 is inserted. Each screw extends through its respective member of each C bracket at substantially right angles to the member and the screws which extend through the arm members are substantially in axial alignment with each other and are parallel to the screws extending through the arms of the other C bracket. The screws which extend through the cross piece of the brackets are also substantially axially aligned with each other. The bar 154 is disposed within the C brackets with each screw bearing against the bar. Thus with bolts 155 loose, the bar 154 may be oriented as desired by adjusting each of the screws in the C brackets. The bar may be raised or lowered at either or both ends, or may be tilted by raising one end and lowering the other end, and it may be moved either "in" or "out" longitudinally as desired. When a proper orientation has been accomplished, bolts 155 are tightened to secure the bolt against plate 54 and thus to maintain the orientation of the loading apparatus on bracket 160.

On one end of bar 154, the end adjacent back panel 8, there is a relieved area which comprises a hole or bore 158 extending into the end of the bar. Compression spring 159 is located within the bore 158 and extends outwardly against its screw 151. The compression spring thus extends between its adjacent screw 151 and the bar 154 to provide a loading force on the bar against the screws 151 which are axially aligned with it.

Plate 156 includes a large relieved area defining an aperture 158. Adjacent aperture 158 is an aperture 55 in support plate 54. The aperture 55 is smaller than aperture 158 and is entirely overlapped by it. Limit switch blade 180 extends through both apertures to open and close a pair of limit switches according to the movement of loader 36.

Figures 10, 11:
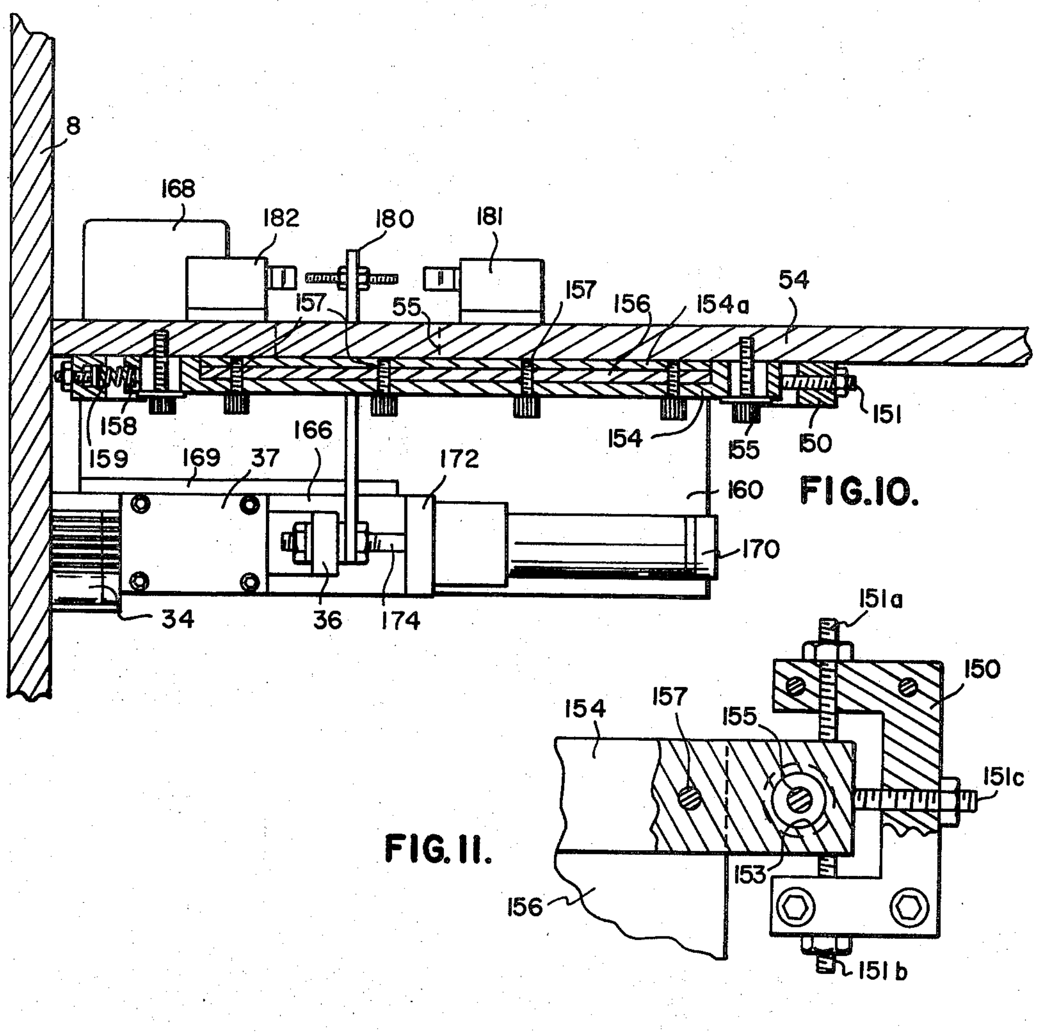
FIG. 10 is a view taken along line 10—10 of FIG. 9.
FIG. 11 is an enlarged partial sectional view of a portion of the apparatus of FIG. 9.

FIG. 10 is a view taken along line 10—10 of FIG. 9 and comprises a plan view of FIG. 9, partially in section. Plate 54 is shown extending from back panel 8. A pair of limit switches 181 and 182 are shown secured on one side of plate 54, and the loading apparatus is shown secured to the opposite side of the plate. Bar 154 is secured to plates 54 and 156 by a pair of bolts 155 and a plurality of screws 157, respectively. In turn, bracket 160 extends from plate 156 and provides support for the loading apparatus. Limit switch blade 180 is secured to loader 36 and moves with it according to movement of the piston rod 174 of the actuator 170. As the loader moves "in" limit switch blade 180 closes the "loader in" limit switch 182, and as the loader moves "back" limit switch blade 180 allows limit switch 182 to open and the blade closes the "loader" limit switch 181. The loading apparatus is shown disposed adjacent stop block 169 on bracket 160.

At one end of bar 154 spring 159 extends from bore 158 in the bar to a screw 151. At the opposite end of the bar, a screw 151 is shown bearing directly against the bar.

Bar 155 includes a cut out portion or relieved area into which the upper portion of plate 156 extends. Bar 154*a* is then inserted into the relieved are of the bar against plate 156. Bar 154*a* comprises a backing plate into which the plurality of screws 157 extend to secure bar 154, plate 156, and bar 154*a* together. Bar 154, including plate 156 and bar 154*a*, may then be tightened against plate 54 by bolts 155.

FIG. 11 is an enlarged partial sectional view of a portion of the apparatus of FIG. 9, and it shows the alignment of bar 154 in C bracket 150. Plate 156 extends from beneath bar 154 and is secured thereto by a screw 157. C bracket 150 includes three screws 151 which extend through the bracket and bear against the end of bar 154. Lock nuts are shown on each of the screws 151 to lock the screws in place after they have been adjusted as desired. Bolt 155 is shown extending in an enlarged aperture 153 in the bar 154.

To adjust or orient bar 154, bolt 155 is first loosened. Screw 151*c* may be loosened from bearing against the end of bar 154, and then either screw 151*a* or 151*b* may be loosened. If it is desired to raise the end of bar 154, screw 151*a* may be loosened and raised as desired, and screw 151*b* may then be tightened or screwed inwardly to raise the end of bar 154 as desired. If it is desired to also move bar 154 to the left, as viewed in the figure, screw 151*c* may be screwed inwardly against the bar to move the bar the appropriate distance. After a proper orientation of the bar is accomplished, screw 151*a* is then tightened against the bar to secure the bar between it and screw 151*b*. Bolt 155 is then tightened against the bar to secure it in place. The diameter of aperture 153 is substantially greater than the diameter of bolt 155 and the bar may accordingly be adjusted a substantial amount without interfering with bolt 155.

Figure 12:
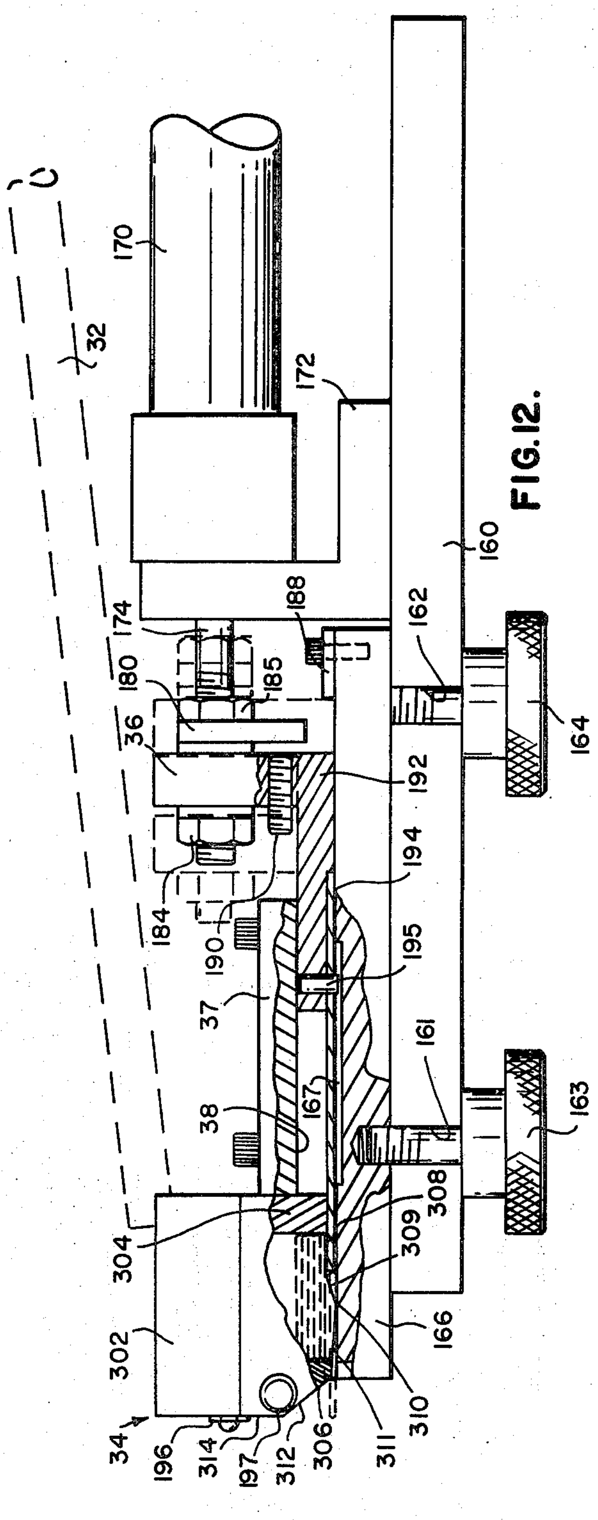
FIG. 12 is an enlarged view in partial section of a portion of the apparatus of FIG. 5.

FIG. 12 comprises a side view, partially in section, of the loading apparatus. The loading apparatus is supported by a bracket 160. Loading hopper 34, guide block 37, and loader 36 are all disposed on a base plate 166, which is secured to bracket 160 by a pair of knurled nuts 163 and 164 which extend through a pair of slots 161 and 162 in bracket 164 into a pair of drilled and tapped holes in base plate 166. By loosening the knurled nuts 163 and 164, the loading apparatus may be adjusted or oriented on the bracket 160.

Pneumatic actuator 170 is secured to bracket 160 through an angle bracket 172. Piston rod 174 extends from the pneumatic actuator 170 and is secured to loader 36 by a pair of nuts 184 and 185 at a threaded portion of the piston rod 174. Appropriate lock washers or flat washers may also be used in conjunction with the nuts 184 and 185. The piston rod 174 also supports and carries limit switch blade 180, which is shown disposed between loader 36 and nut 185 on the piston rod.

When moved by the actuator to either the "in" or the "back" position, the loader 36 moves between guide block 37 and a stop block 188. Stop block 188 is secured to base plate 166 by any appropriate means, such as a screw, as shown. The stop block 188 may be adjusted as desired to define the "back" position or limit of the loader.

An adjustable screw 190 extends into a drilled and tapped hole in loader 36. As the loader moves "in," the screw 190 abutts a rear face of guide block 37 to define the "in" limit of travel of the loader. The screw 190 may be adjusted as desired to alter the "in" limit of travel. Thus loader 36 has a length of travel between guide block 37 and stop block 188, as determined by the adjustment of screw 190 and the position of stop block 188. The length of travel of the loader is shown in phantom.

Loader 36 includes a blade portion 192 which extends at right angles to loader 36 and is substantially parallel to the movement of piston rod 174. The blade 192 is guided within a slot 38 in guide block 37. A pusher blade 194 is secured to pusher 192 by a pin 195. The blade 194 is generally parallel to pusher 192 and is thin in relation to the thickness of pusher 192. The blade 194 is connected to the pusher in a cut-out or relieved area thereof such that both the pusher and the blade define a smooth, flat bottom surface and are disposed and move freely on base plate 166. Base plate 166 includes a slot 167 on its top surface into which a portion of pin 195 extends and is guided as it moves therein. During the forward or "in" movement of loader 36, the blade 194 extends beneath loading hopper 34 and moves a cluster of pins from the loading hopper into a waiting pin insertion head.

Loader 34 includes a bin housing 302 and a bin frame 306 within the housing 302. Bin frame 306 extends to back plate 304 of the bin housing and terminates adjacent the back plate so as to be spaced apart a slight distance therefrom. The bin housing 302 and back plate 304 are fixed in place with respect to base plate 166 while bin frame 306 pivots about pivot pin 197 with forward or "in" movement of pusher blade 194. Pivot pin 197 extends through the bin housing 302 and through the bin frame 306. The bottom of bin frame 306 is irregular in configuration, and includes a portion 308 which is generally parallel to base plate 166 from the lower rear or back corner of the bin frame and is spaced apart substantially the thickness of blade 194 from base plate 166. The bottom portion 308 extends forward a distance generally parallel to base plate 166 and then tapers downwardly and forwardly in a sloping portion 309 to a bottom edge 310 which rests on base plate 166. From this point, the bin frame and housing extend upward and forward at about a 45° angle to define a lower front edge 312. Edge 312 terminates adjacent pivot pin 197 and the front edge of the bin housing and the bin frame then rises vertically to define an upper front edge 314.

In response to movement of loader 36, pusher blade 194 extends beneath the bottom portion 308 of bin frame 306 and contacts sloping portion 309 of the bin frame bottom. As the blade continues to move forward, the sloping portion 309 acts as a cam with respect to the blade to pivot the bin frame upwardly and forwardly about pivot pin 197. As the blade reaches the bottom edge 310, and moves underneath the edge, the bin frame ceases its pivoting movement but the blade continues to move "in" beneath the bin frame.

Positive contact is provided between the blade as it moves beneath the bin frame 306 and a cluster of pins from the bin frame which the blade engages and which it pushes forward from the hopper into an awaiting pin insertion head. The blade is substantially the thickness of a pin, and the distance between base plate 166 and the bottom portion 308 of the bin frame is substantially the same. This allows the single pin to extend downwardly from each slot or bin within the bin frame to the base plate 166 where blade 194 can move it forward into an awaiting pin insertion head. Pins are fed into the hopper 34 through delivery tube 32, shown in phantom.

A leaf spring 196 is secured to the front of bin housing 302. The end of spring 196 is disposed against the bin frame to provide a bias against its pivoting. As blade 194 is withdrawn from beneath loading hopper 34, the action of the spring is such to urge the bin frame 306 downwardly with sufficient force that a new or fresh cluster of pins within the bin frame makes positive contact with the top of base plate 166 to await the next "in" movement of the loader and the pusher blade 194. Bottom edge 310 of the bin frame thus makes positive contact with the top of base plate 166 under the urging of the spring 196. The bias of the spring against the bin frame may be adjusted or varied by moving the end of the spring, or the portion of the spring that contacts the bin frame, relative to the pivot pin 197. The closer the force of the spring is applied to the pivot of the bin frame, the less the bias or force of the spring against the bin frame. The farther the force of the spring is applied away from, and above, the pivot, the greater the bias or force applied to the bin frame.

Figure 13:
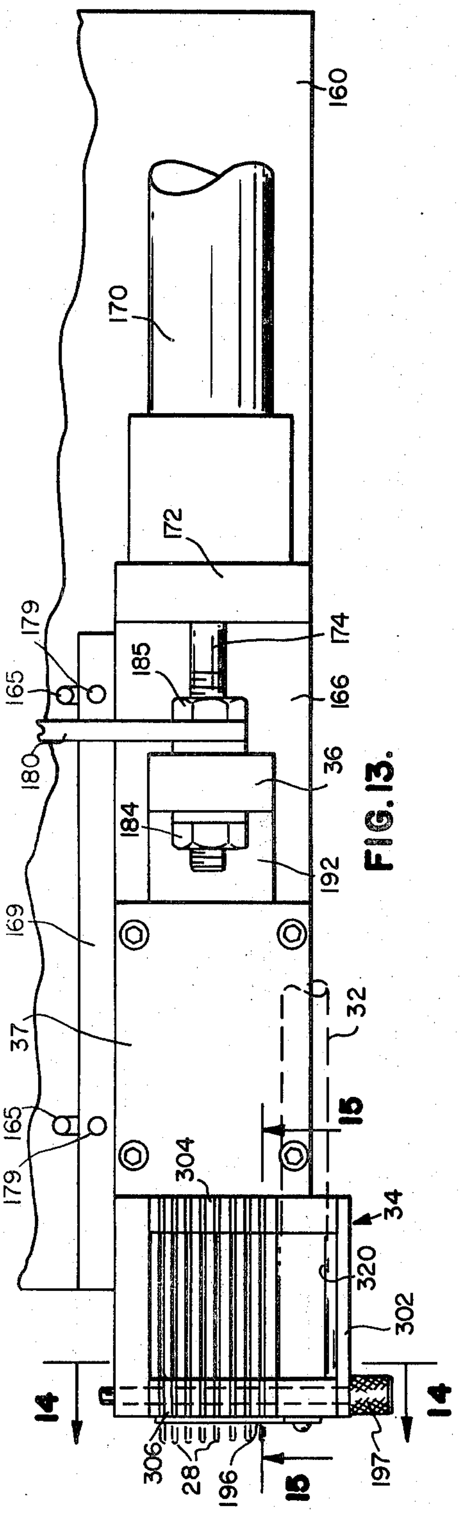
FIG. 13 is a plan view of the apparatus of FIG. 12.

FIG. 13 comprises a plan view of the apparatus of FIG. 12. The loading apparatus is shown disposed on bracket 160. Actuator 170 is disposed on, and secured to, bracket 160 by angle bracket 172. Piston rod 174 extends from actuator 170 to loader 36 and is secured thereto by a pair of adjustable nuts 184 and 185 at a threaded portion of the piston rod. Limit switch blade 180 is also secured to piston rod 174 and extends from the piston rod at substantially a right angle thereto. Base plate 166 is also secured to bracket 160, and loader 36, guide block 37, and loading hopper 34 are all disposed on and secured to the base plate. Pusher 192 extends from loader 36 beneath or within guide block 37. Spring 196 is secured at the front of the hopper to the bin housing and provides a bias agains bin frame 306. Bin frame 306 pivots on pivot pin 197 which extends through bin housing 302 and through the bin frame.

Pins are supplied to the loading hopper 34 by delivery tube 32, which is shown in phantom. Pins from the tube are delivered to a trough 320 on bin housing 302. From the trough, the pins move by gravity and by vibratory action into a plurality of slots or bins within the bin frame. A plurality of pins 28 is shown extending slightly from vertical front edge 314 of the hopper 34.

A stop block 169 is disposed on bracket 160 parallel to base plate 166. The stop block 169 is adjustable on the bracket 160 and is secured to the bracket by a pair of screws 179. The screws extend through a pair of elongated slots 165 in the bracket 160 into a pair of drilled and tapped holes in block 169. To orient the loading apparatus in the X direction as desired with respect to the pin insertion head, the stop block 169 is first appropriately oriented on and secured to the bracket 160. The base plate 166 is then disposed against the stop block on bracket 160 and secured thereto by the knurled nuts 163 and 164, as shown in FIG. 12.

Figures 14, 15, 16:
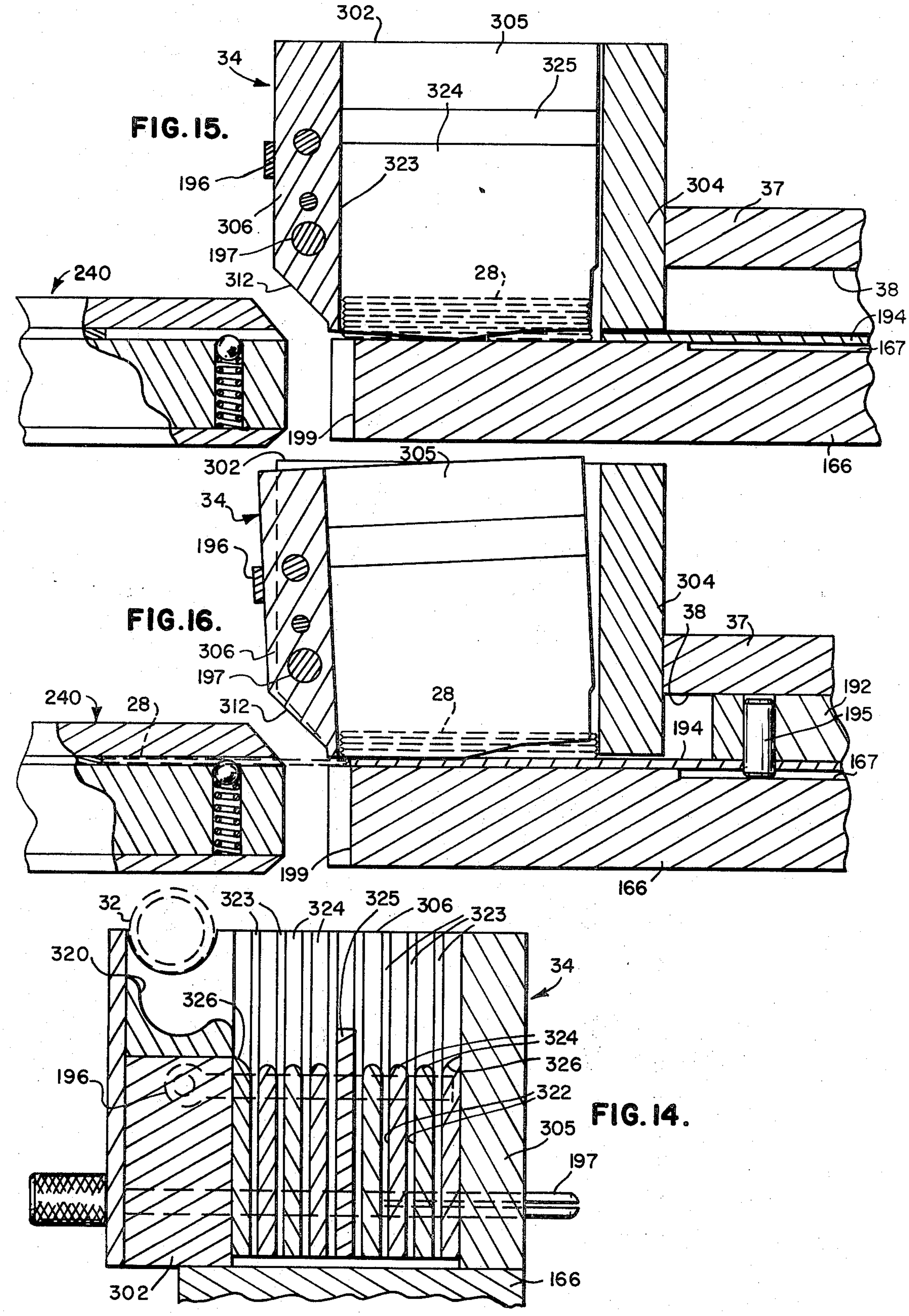
FIG. 14 is an enlarged section taken along line 14—14 of FIG. 13.
FIGS. 15 and 16 are sequential views in section illustrating the operation of the apparatus of FIGS. 12–14.

FIG. 14 comprises a sectional view taken along line 14—14 of FIG. 13. The figure is a sectional view through loading hopper 34. Pin delivery tube 32 is shown in phantom and pins emanating therefrom fall into trough 320. From trough 320 the pins move by gravity and by vibratory action into a plurality of slots or bins 322. Since the pins move axially or longitudinally through the delivery tube, they are thus disposed within trough 320 in the same manner and accordingly move into the bins or slots 322 in a similar orientation.

The bins or slots are defined by a plurality of bin or slot laminations 323 separated by a plurality of spacers 324 and 326. The loading hopper 34, as illustrated in FIG. 14, includes eight bins or slots. The center spacer 325 extends above the other spacers 324 and 326. Center spacer 325 has a rectangular profile with a flat top center portion, as opposed to the rounded or bullet nosed center profile or spacers 324. End spacers 326 are convexly rounded away from their respective adjoining slots. The bin frame 306 is of laminar construction, with a plurality of alternate spacers and bin laminations secured together. Center spacer 325 extends above the spacers 324 and 326 so as to prevent pins from trough 320 becoming oriented sideways or crossways to the slots. The center spacer thus helps to keep the pins in axial or longitudinal orientation in the slots. If desired, any number of bins or slots may be blocked to limit the number of pins inserted into a head and into a circuit board.

Spring 196 is shown in phantom secured to bin housing 302. The spring provides a biasing action to urge bin frame 306 into position between trough 320 and side plate 305 of the bin housing 302 after the pivoting action of the bin frame about pivot pin 197.

FIGS. 15 and 16 are sectional views showing the sequential action of the loading apparatus in moving a cluster of pins from loading hopper 34 into a pin insertion head 240. In FIG. 15, loading hopper 34 is shown disposed on base plate 166, and guide block 37 is adjacent end wall 304 of bin frame 302. Pusher blade 194 is disposed on base plate 166 within guide slot 38 of guide block 37 and partially beneath end wall 304. A pin insertion flip head 240 is aligned with the loading hopper 34 to receive a cluster of pins. The flip head 240 is disposed beneath the lower front edge 312 of the loading hopper 34 and adjacent a relieved portion 199 on base plate 166.

A plurality of pins 28 is shown within a bin or slot 323 in bin frame 306. A spacer 324 separates the pins in the slot from pins in an adjacent slot. Center spacer 325 extends above spacer 324. Side plate 305 of bin housing 302 is parallel to spacers 324 and 325 and is connected to back plate 304. The pins 28 are in a stacked or superimposed relation to each other, with the lowermost pin lying on base plate 166 awaiting pusher blade 194.

Bin frame 306 comprises a plurality of laminations held together by appropriate fastening means, such as pins, bolts, or screws, as desired. Leaf spring 196 provides a bias agains bin frame 306 as the bin frame pivots on pivot pin 197.

FIG. 16 is a sequential view, also in section, showing showing the relationship of the apparatus of FIG. 15 at the completion of the "in" movement of the loading apparatus. Pusher 192 is shown within slot 38 of guide block 37, and pusher blade 194 is secured to the pusher by a pin 195 which extends into guide slot 167 in base plate 166. Pusher blade 194 extends beneath back plate 304 of bin housing 302, and beneath bin frame 306. The pusher blade 194 has loaded a pin 28 into pin insertion flip head 240, and has pivoted bin frame 306 about pivot pin 197 and against the bias of leaf spring 196.

As the loading apparatus moves back, the blade 194 will withdraw from beneath bin frame 306 and will allow the bin frame to return under the urging or bias of spring 196 to the position of the bin frame shown in FIG. 15. As the bin frame returns, the force of the frame contacting the upper surface of base plate 166 is sufficient to jar the stack of pins 28 within slots or bins in the bin frame down such that a pin will rest against the upper surface of base plate 166 where it will await the next "in" movement of the pusher blade 194.

While the bin frame 306 pivots on pin 197, the bin housing 302, which includes side plate 305 and back plate 304, remains in position on base plate 166. Spring 196 is secured to bin housing 302 and may be adjusted either toward or away from the pivot pin 197 to provide the desired bias against the bin frame.

Within pin insertion flip head 240, pin 28 is held in place by a spring loaded ball bearing. A tip of the pin extends forward from the insertion head and into relieved portion 199 of the base plate 166 beneath the front portion of loading hopper 34. The relieved portion 199 provides clearance for the pin, or for a cluster of pins, as the pin insertion head "flips" away from the loading apparatus and into position to insert the pins into a circuit board.

Figure 17:
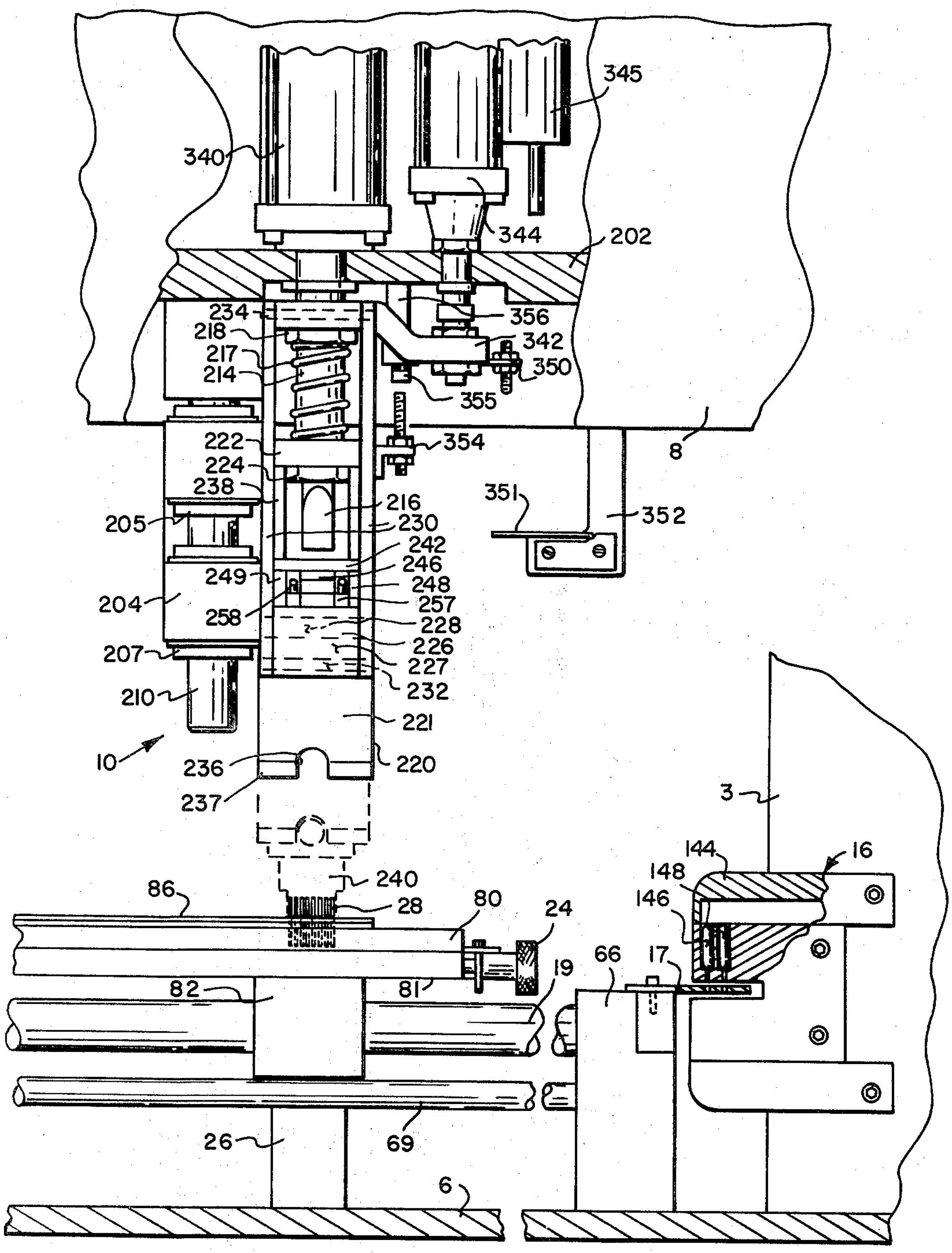
FIG. 17 is an enlarged view in partial section of a portion of the apparatus of FIG. 3.

FIG. 17 is an enlarged view, in partial section, of a portion of the apparatus of FIG. 3. The platform or table 6 is shown, with a portion of the X and Y drive units and the table 80 and table frame 81. Anvil 26 is shown disposed beneath table 80 and beneath a circuit board 86 thereon. Pin insertion apparatus 10 is shown above the circuit board with pin insertion flip head 240 shown in phantom in position to insert a cluster of pins 28 into and through the circuit board. Table frame 81 is shown secured to a bearing block 82 and a guide rod 19 is shown extending through the bearing block. Y drive shaft 69 is disposed beneath the table 80 and above the platform or table 6 and in front of anvil 26. The X vernier thumb screw 24 is shown adjacent an end of the table 80 and table frame 81.

Punched metal strip 17 for the Y photosensor 16 is shown disposed on end rail 66. The Y photosensor 16 includes a photosensor housing 144 secured to end post 3. Within the housing 144 are a pair of light sources, Y limit light source 146 and Y stop light source 148. The light sources 146 and 148 are disposed in the upper portion of housing 144 above a pair of photocells. The punched metal strip 17 is disposed intermediate the light sources and their respective photocells. As the Y drive unit, including end rail 66, moves, the punched metal strip 17 is moved through housing 144 intermediate the light sources and the photocells. When a hole in the punched metal strip is sensed by a light source and its photocell, a signal is sent through appropriate circuitry, including an amplifier system to the Y drive motor to signal the drive motor to stop.

Above the table 80 and circuit board 86 thereon, the pin insertion apparatus 10 is secured to structural support member 202 which in turn extends between back panel 8 and front panel 12 (see FIG. 3). The pin insertion apparatus includes a pin insertion flip head 240 shown in phantom as disposed on circuit board 86, which is disposed within guide housing 220. Guide housing 220 is secured to guide yoke 204 which is disposed beneath structural support member 202 between the front and back panels. As previously discussed in conjunction with FIG. 5, the guide yoke 204 includes a pair of guide rods including guide rod 210, and a pair of bushings, designated as upper bushing 205 and lower bushing 207. The guide housing 220 is secured to the guide yoke 204 and moves on the guide rods. The pin insertion flip head is in turn movable with and within the guide housing 220.

Guide housing 220 includes a guide housing front base plate 221 and a guide housing top plate 222. Piston rod 214 extends through an aperture in guide housing top plate 222, and the movement of the piston rod provides the motive force for moving the guide housing and the pin insertion flip head down and up. A coil spring 217 is disposed about the piston rod and extends between a nut 218 on the piston rod and the guide housing top plate 222. Ram 16 is secured to the piston rod beneath guide housing top plate 222, and a nut 224 is also secured to the piston rod beneath the guide housing top plate. The nut 224 is of a greater diameter than the aperture in the top plate and on the upward stroke of the piston rod the hut bears against the lower side of the guide housing top plate 222 to return the guide housing and the pin insertion flip head to the up position.

The guide housing front base plate 221 includes a notch 236 at its lower portion. The face plate terminates in a beveled edge 237. The notch receives a knurled nut which secures the head to a back plate which is part of a trapeze harness whose function is to swing or flip the head from the horizontal position in which it receives a cluster of pins from the pin loading apparatus to the vertical position in which the head inserts a cluster of pins into an awaiting circuit board.

A pair of trapeze straps 230 extend between a pivot pin 234 adjacent structural member 202 to which it is secured, and a pin 232 at trapeze harness 226.

Piston rod 214 is powered by or moved by a pneumatic actuator 340. When an appropriate signal is generated to move the head and the ram "down," a valve is actuated which provides air on one side of a piston within pneumatic actuator 340. Piston rod 214 is secured to the piston within the actuator and is accordingly moved by it in response to the pressure of the air. To move the pin insertion apparatus up, the opposite side of the piston is pressurized and the apparatus moves up and the flip head moves into position to receive a cluster of pins from the loading apparatus. A bracket 342 extends from piston rod 214 to a piston rod of oil cylinder 344. Oil reservoir 345 is disposed adjacent the oil cylinder 344 and provides a supply of oil for the oil cylinder. The purpose and function of the oil cylinder is to control the rate of travel of the piston rod 214. The rate of travel is controlled by varying an orifice within oil cylinder 344. If a fast rate of travel, and accordingly a fast rate of actuation, of the pin insertion head apparatus is desired, then the size of the orifice is increased and if a slower rate of travel is desired the size of the orifice is decreased. Accordingly, a wide range of travel rates is available by carefully adjusting the size of the orifice.

By controlling the pressure of the air to pneumatic actuator 340, the pressure of the pin insertion head during the insertion of pins into a circuit board may be varied to compensate for the number of pins in a cluster. If, for example, one or more bins or slots in the loading hopper is blocked so as to present a cluster of seven or less pins to a head, less force or pressure will be required to insert such a cluster into a board. Accordingly, the pneumatic pressure at the actuator may be decreased to reduce the force of the head in inserting the cluster of pins into a circuit board.

Bracket 342 includes a limit switch actuator 350 which moves with the bracket to open and close ram down limit switch 351. The ram down limit switch 351 is connected to back panel 8 by a limit switch bracket 352. A ram up limit switch actuator 354 is secured to guide housing 220 at the guide housing top plate 222. The limit switch actuator opens and closes ram up limit switch 355, which is secured to structural support member 202 by a limit switch bracket 356. The ram up limit switch actuator 354 moves with the guide housing 220. As shown, the ram up limit switch actuator has closed ram up limit switch 355, indicating that the ram, and accordingly the pin insertion head apparatus, is in the "up" position.

Figure 18:
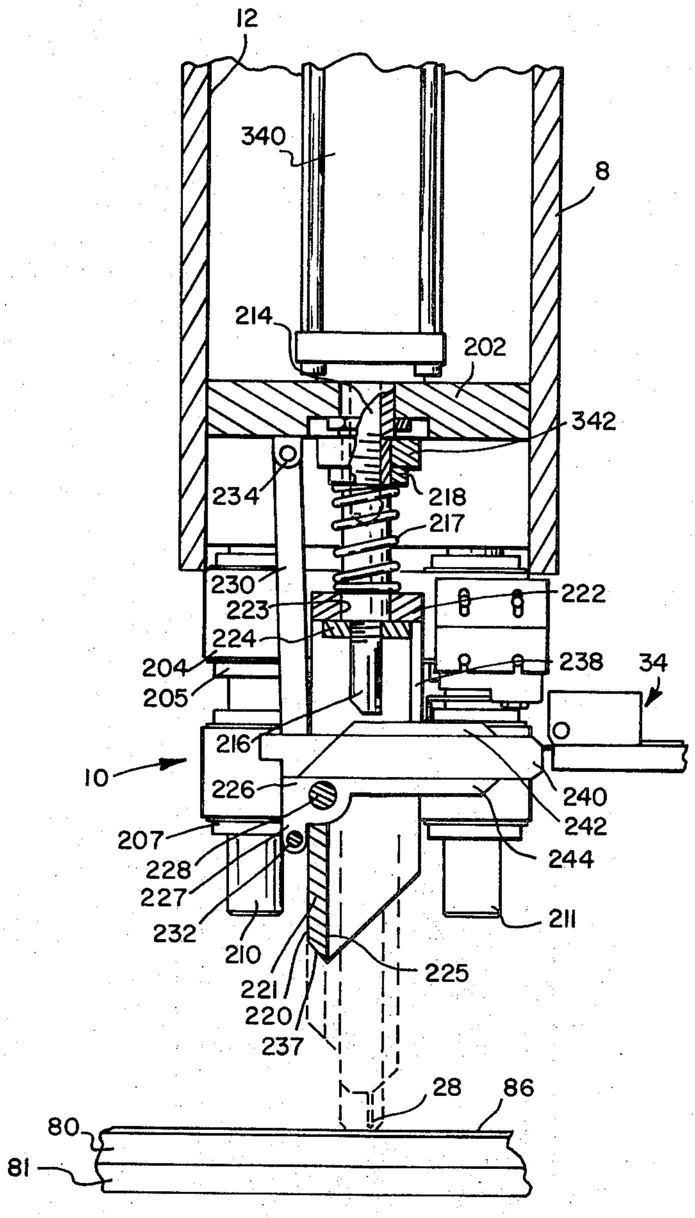
FIG. 18 is an enlarged view in partial section of a portion of the apparatus of FIG. 5.

With the pin insertion head in the "up" position, the head is in position to receive a cluster of pins from the loading apparatus (see FIGS. 5 and 18). In the "up" position, the pin insertion head is flipped 90° from the "down" position shown in phantom and is disposed horizontally, or perpendicular to the guide housing 220. In the "up" or horizontal position the pin insertion head 240 is seen on end, as viewed in FIG. 17. Front plate 242 is shown edgewise, disposed against a stop block 238 within guide housing 220. Pusher 246 is adjacent and beneath front plate 242, with its shoulders against a pair of stop pins 258 which extend from holder plate 257. A pair of side plates 248 and 249 are disposed on either side of the pusher 246 and holder plate 257 and between front plate 242 and trapeze harness 226. The pin insertion head 240 pivots or flips about pivot pin 228, shown in phantom, within trapeze harness 226. The offset portions 227 of the trapeze harness extend from holder plate 257 downwardly, as viewed in FIG. 17, and connect with trapeze straps 230 at pin 232.

When pin insertion apparatus including the guide housing 220 and the pin insertion head 240, is moved downwardly by actuator 340, the pin insertion head flips from the observed and described position to the position shown in phantom, vertically disposed on top of circuit board 86. The pin insertion head pivots about pivot pin 228 while the trapeze harness pivots on the offset portion 227. The insertion head is limited in its pivoting action according to trapeze straps 230 which extend from pin 234, secured to structural support member 202, and pin 232 extending through the offset portion 227 of the trapeze harness 226.

Once the pin insertion head has flipped from the "up" to the "down" position, the ram 216 continues to move downwardly according to the movement of piston rod 214 of the actuator 340, and engages pusher 246 of the pin insertion head. The force of the ram 216 on the pusher moves the pusher with the cluster of pins downwardly and onto the circuit board, and the cluster of pins 28 are thereby inserted into and through the circuit board, as shown. Downward movement of the ram stops when limit switch actuator 350 on bracket 342 closes down limit switch 351.

When actuator 340 is pressurized upwardly, the piston rod and ram withdraw from the pusher and under spring pressure the pusher moves upwardly until it is stopped by the pair of stop pins 258. In the meantime, nut 224 engages the under side of guide housing top plate 222 and moves the housing upwardly until limit switch actuator 354 closes up limit switch 355 and the upward travel of piston rod 214 of the actuator is then stopped.

During the up travel of the guide housing, the pin insertion head 240 flips from the vertically oriented down position through an arc of 90° to the up position, where it is once again aligned with loading apparatus and where it receives a new cluster of pins.

FIG. 18 is an enlarged view in partial section of a portion of the apparatus of FIG. 5, and it also comprises a view of part of the apparatus of FIG. 17 substantially at right angles thereto. The pin insertion head apparatus 10 is shown disposed above a circuit board 86, and sequential movement of pin insertion flip head 240 is shown in phantom from the head in the up position aligned with the loading hopper 34 through movement of the head downwardly and the insertion of a pin 28 into and through a circuit board 86 which is disposed on table 80 and on table frame 81.

The pin insertion head apparatus is shown supported by and depending from structural support member 202 which extends between front panel 12 and back panel 8. Above the structural support member 202 is pneumatic actuator 340, and piston rod 214 extends downwardly through structural support member 202 from the actuator. Bracket 342 is disposed on and secured to the piston rod above nut 318. Coil spring 217 extends about piston rod 214 between nut 218 and guide housing top plate 222. Both ram 216 and nut 224 are fastened to the piston rod beneath guide housing top plate 222. The diameter of nut 224 is greater than the diameter of aperture 223 in guide housing top plate 222.

Guide yoke 204 moves on a pair of guide rods 210 and 211 to move the guide housing 220 and the pin insertion flip head 240 and ram 216 in response to movement of piston rod 214. Guide rods 210 and 211 are substantially parallel to each other and are fixed to structural support member 202. Guide yoke 204 includes upper bushings 205 and lower bushings 207 through which the guide rods extend. The guide housing 220 includes a guide housing side plate 225 and a guide housing front face plate 211. The guide housing front face plate 221 terminates in a beveled edge 237 at its lower or bottom portion. Side plate 225 extends from the front face plate 221 to the guide housing top plate 222. Guide yoke 204 is appropriately fastened to guide housing side plate 225. A stop block 238 is also fastened to side plate 225 and extends downwardly from guide housing top plate 222. The purpose of the stop block is to limit the upward travel of flip head 240 and thus to define the "up" position of the flip head 240 with respect to the loading apparatus. In the "up" position, flip head 240 must be aligned with loading hopper 34, and the stop block 238 is accordingly used to limit the "up" travel of the flip head. A physical abutting relationship is established between the stop block 238 and front plate 242 of the flip head. Thus the upward movement of the head is physically stopped when the front plate 242 contacts the stop block.

The pin insertion flip head 240 is pivoted on pivot pin 228 of trapeze harness 226. The trapeze harness includes an offset portion 227 through which a pin 232 extends. A pair of trapeze straps 230 extend from pin 232 to a pin 234 at the structural support member. As the piston rod 214 moves the guide rod 220 up and down, the trapeze harness 226 serves to pivot the flip head 240 from its up position to its down position where it is in position to insert a cluster of pins into a circuit board. The trapeze straps limit the travel of the flip head as it moves up and down. With one end of the strap being secured to pin 234 at the structural member 202, the other end of the strap can only move a limited distance which defines an arc, the radius of which is the length of offset portion 227 of the trapeze harness. A portion of trapeze harness 226 comprises back plate 244 for the flip head 240, and accordingly the trapeze harness is an integral part of the flip head.

When the flip head is in the "down" position, or vertically aligned for inserting a cluster of pins into a circuit board, back plate 244 is juxtaposed against guide housing front face plate 221. The back plate 244 and flip head 240 are held against the front face plate by the trapeze straps and the trapeze harness.

Figure 19:
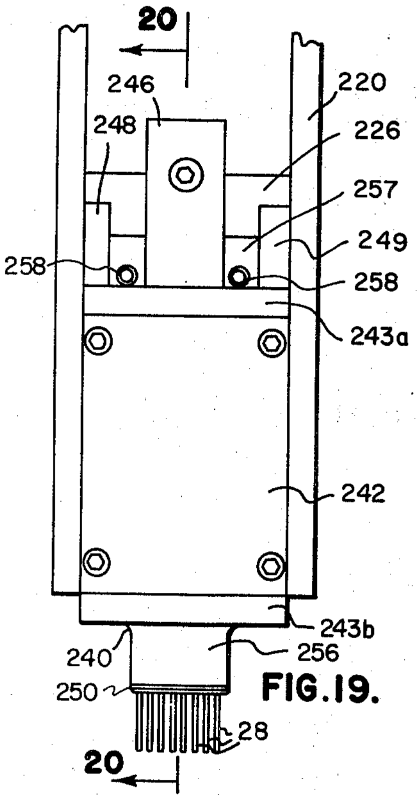
FIG. 19 is an enlarged view of a portion of the apparatus of FIG. 17 rotated 180°.

FIG. 19 is a view of pin insertion head 240 aligned vertically within guide housing 220. The view is an enlargement of a portion of the apparatus of FIG. 17, but rotated so as to show a front longitudinal view of the pin insertion flip head 240. The pin insertion head nestles within the guide housing 220 and moves with and within the housing. For the loading of the pins into the head, the head rotates 90° within the housing, and inserting a cluster of pins the head moves downward with the housing. The pin insertion head includes front plate 242, trapeze harness 226, a portion of which comprises back plate 244 (see FIG. 20), and a pair of side plates 248 and 249. The front plate and the trapeze harness and back plate are both secured to the side plate so as to constitute a housing for a pusher 246 and for pin holder structure 250. Intermediate pusher 246 and trapeze harness 226 is a holder plate 257. The holder plate includes a pair of stop pins 258 which engage shoulder portions of pusher 246 to stop the pusher in its upward travel. Front plate 242 terminates in a pair of bevelled edges 243*a* and 243*b* at its upper and lower portions, respectively. Extending beneath the lower bevelled edge 243 of front plate 242 is pin holder structure 250, including a holder cap 256, holder block 255, and holder plate 257. A cluster of pins 28 extends from beneath holder cap 256. The holder cap 256 is secured to holder block 255 and to holder plate 257, and they move downwardly as a unitary structure, under the urging of the downward movement of pusher 246. The holder cap 256 is disposed beneath a portion of pusher 246.

Figure 20:
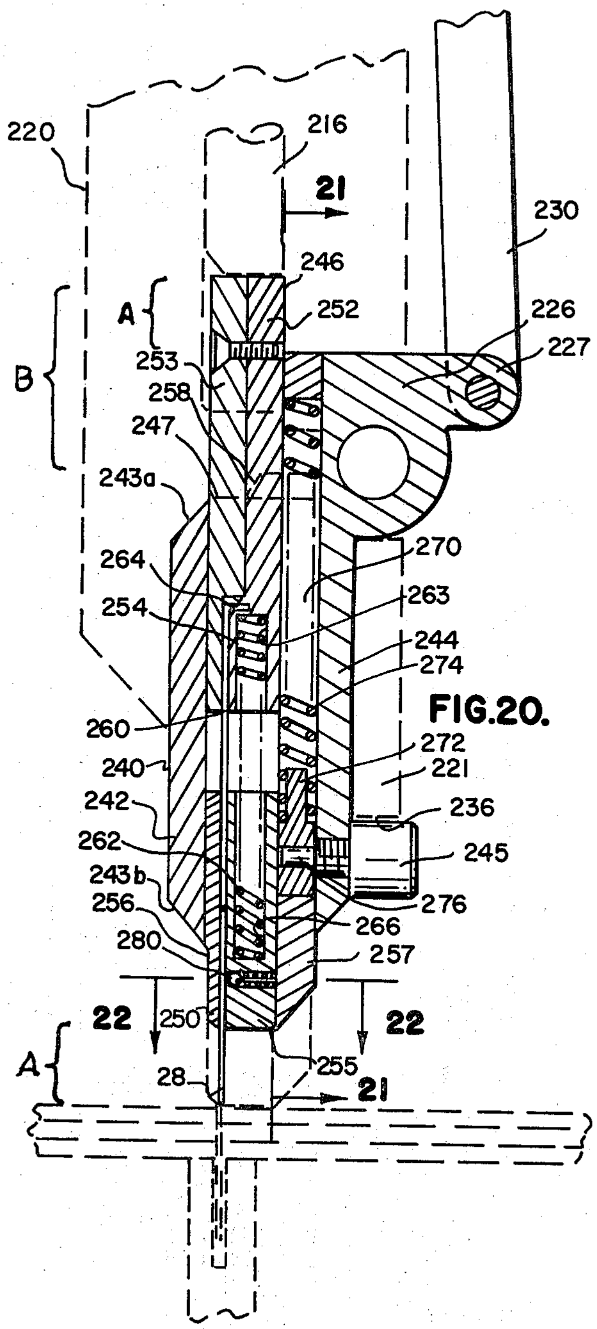
FIG. 20 is a sectional view taken along line 20—20 of FIG. 19.

FIG. 20 is a sectional view of the apparatus of FIG. 19, taken along line 20—20 of FIG. 19. Pin insertion head 240 is shown in vertical alignment within guide housing 220 and disposed against guide housing front faceplate 221, both of which are shown in phantom. A trapeze strap 230 is also shown in phantom extending upwardly at less than a right angle from offset portion 227 of trapeze harness 226. Trapeze harness 226 includes back plate portion 244, to which knurled nut 245 is screwed at a lower portion of the back plate 244. Knurled nut 245 extends through notch 236 in guide housing front faceplate 221. Located between back plate 244 of trapeze harness 226 and front plate 244 of the pin insertion head 240 is pusher 246 and holder plate 257. Pusher 246 includes a pusher block 252 and a pusher cap 253. The pusher block and pusher cap are secured together by appropriate fastening means. Pusher 246 includes a pair of shoulders 247, which shoulders are coincidental and coextensive on both the pusher block and the pusher cap. With the pusher in the "up" position, the shoulder 247 is disposed against a pair of stop pins 258 extending outwardly from an upper portion of holder plate 257.

Pusher block 252 includes an offset portion 254. A plurality of pusher pins or push rods is disposed in grooves or slots in the offset portion 254 of the pusher block 252. The pusher block includes a groove and a push rod for each pin which comprises the cluster of pins insertable by the pin insertion head.

A bore 263 is located within the lower portion of pusher block 252 adjacent the offset portion. One end of a pusher spring 262 is disposed within the bore and the spring extends out of the bore. Spring 262 is a compression spring.

Pusher cap 253 includes a relieved portion 264 which mates with the offset portion 254 of the pusher block to retain the pusher pins in their grooves. The pusher cap and the pusher block terminate above the ends of the pusher pins such that the pusher pins extend from the pusher.

A pusher pin 260 has an elongated "L" configuration, with a relatively long portion and a relatively short offset portion disposed at 90° to the long portion. The offset portion of the pusher pin is disposed on a groove in the top of the offset portion 254 of the pusher block, and the long portion is disposed in grooves in axial alignment with the pin insertion head and it extends downwardly from the pusher. Pusher cap 253 is mated against and secured to pusher block 252 and holds the pusher pins in place and in their respective grooves in the pusher block. The relieved area or portion 264 of pusher cap 253 matingly corresponds to the offset portion 254 of the pusher block.

At the lower portion of holder plate 257, and secured thereto, is a holder block 255 and a holder cap 256, which together comprise holder structure 250. Both the holder block and the holder cap are secured to holder plate 257 and move with the holder plate. Holder cap 256 is adjacent front plate 242 and is slidingly engaged therewith. Holder block 255 is substantially parallel to, and is the same thickness as, pusher block 252, including the offset portion 254. The holder block includes a plurality of grooves axially aligned with the pusher pin grooves of the offset portion 254 of pusher block 252. The pusher pins extend into and are axially movable with the holder block grooves. Also received within the grooves in holder block 255 is a cluster of pins 28 from the loading apparatus. Pins 28 are accordingly in axial alignment with the pusher pins.

Holder block 255 includes a bore 266 which is axially aligned with bore 263 in pusher block 252. The other end of pusher spring 262 extends into the bore. The pusher spring 262 thus extends into the aligned bores 263 and 266 to urge the pusher 246 away from the holder block 255, holder cap 256, and holder plate 257, which are secured together.

As ram 216, shown in phantom, contacts pusher 246 and urges the pusher downwardly, pusher spring 262 causes the holder block, with the holder cap and the holder plate, to also move downwardly. When holder block 255 stops its downward travel adjacent a circuit board, the pusher 246 continues to move under the force exerted by ram 216, and the pusher spring is compressed. At the same time, the pusher pins 260 move downwardly against pins 28 to insert the pins into the circuit board. Pusher 246 is spaced apart from the holder block in the holder cap a sufficient distance to allow for the complete insertion of a cluster of pins into the circuit board by the continued downward movement of the pusher and the pusher pins.

Figure 21:
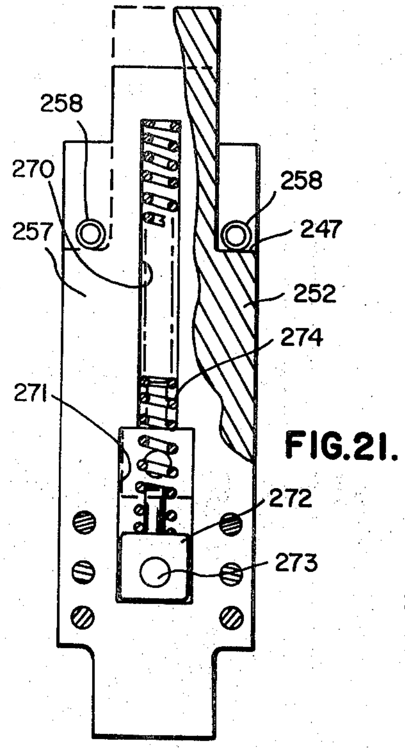
FIG. 21 is a fragmentary sectional view taken along line 21—21 of FIG. 20.

Holder plate 257 is shown in section in FIG. 20 and its relation to the other structural members of the pin insertion head is illustrated. FIG. 21 is a view taken generally along line 21—21 of FIG. 20, and it discloses details of holder plate 257 and of cooperating structural members pertaining thereto. Accordingly, reference should be made to both FIGS. 20 and 21 in conjunction with the description and function of holder plate 257.

The holder plate includes a bore 270 which extends axially of the plate. At the lower portion of the plate, bore 270 widens and defines an enlarged bore portion 271. The enlarged bore portion 271 receives a spring block 272. A head return spring 274 is disposed within the bore and it comprises a compression spring applying a bias on spring block 272. Spring block 272 is movable freely within enlarged bore portion 272 in a direction axially of the holder plate, but it will not fit into bore 270. Spring block 272 includes a bore 273 into which extends pin 276 of the knurled nut 245.

Pusher 246 is disposed above the holder block and the holder cap and is biased apart from the block and cap by the compression spring 262. Under the urging or force of ram 216, pusher 246 is moved downwardly against compression spring 262 and the pin holder structure 250, including the holder block, holder cap and holder plate, moves downwardly with the pusher. Back plate 244 is fixed relative to both the pusher 246 and the holder plate and its block and cap. Accordingly, the pusher and the holder structure move relative to back plate 244. Knurled nut 245 is fixed in back plate 244 and its pin 276 extends into bore 273 of spring block 272. As holder plate 257 moves, pin 276 of the knurled nut 245 holds the spring block 272 in place and the spring block moves in enlarged bore portion 271 of the holder plate. This relative motion between the holder plate and the spring block compresses head return spring 274. The axial length of enlarged bore portion 257 and of the holder block and holder cap which are secured thereto. Thus when the enlarged bore portion 271 narrows at bore 270, the spring block 272 cannot move relative to the holder plate. The length of travel or movement of the holder assembly is accordingly determined by the length of the enlarged bore portion 271. In practice, the location of the pin insertion head relative to a circuit board is such that the length of travel of the holder assembly locates or positions the holder assembly a very slight distance above the circuit board. When the holder assembly has reached its limit of travel, the head return spring 274 will be in a state of compression. At this time, the ram 216 has moved from its position shown in phantom above pusher 246 downwardly a distance indicated by bracket A in FIG. 20.

When holder plate 257 with its cap and block secured thereto ceases its downward travel, ram 216 continues to move pusher 246 downwardly. This continued downward movement compresses pusher spring 262 in bores 263 and 266 of pusher block 252 and holder block 255, respectively, and pusher pin 260 forces pin 28 out of the pin insertion head and into an awaiting hole in a circuit board. The total distance moved by ram 216 and pusher 246 is indicated by bracket B in FIG. 20.

When ram 216 withdraws from pusher 246, the pusher is moved upwardly and away from holder block 255 and holder cap 256 by the action of compression spring 262. At the same time the pusher spring 262 is exerting its force agains pusher 246, head return spring 274, which is also a compression spring, is exerting a force between holder plate 257 and spring block 272 which is fixed in place relative to back plate 244 through pin 276 of knurled nut 245. The relative motion urged by head return spring 274 accordingly moves holder plate 257, and the holder block and holder cap secured thereto, upwardly relative to back plate 244 and front plate 242. Thus the upward motion of the holder assembly or structure is independent of, but related to, the upward movement of pusher 246.

The upward motion of the pusher is limited by or defined by stop pins 258 in holder plate 257. As best shown in FIG. 21, shoulders 247 of pusher 246 engage stop pins 258 and the upward movement of the pusher is thus terminated. FIG. 21 includes a broken or fragmentary portion of pusher block 252 shown overlying the holder plate 257, with shoulders 247 against stop pin 258.

Figure 22:
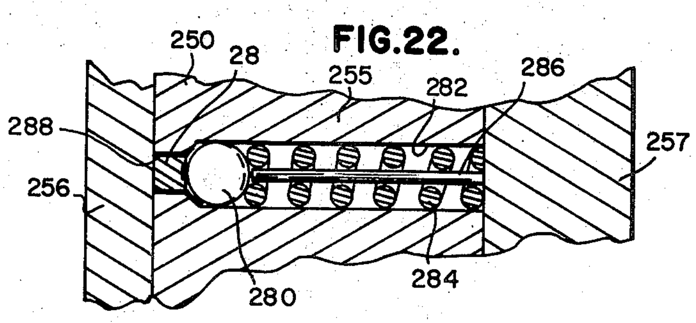
FIG. 22 is a sectional view taken along line 22—22 of FIG. 20.

FIG. 22 is a sectional view taken along line 22—22 of FIG. 20, and it comprises a fragmentary view through the holder structure 250, including holder block 255, holder cap 256, and holder plate 257. The view illustrates frictional means used to hold a pin 28 within the holder structure. Holder block 255 includes a bore 282 extending perpendicular to the axis of the pin insertion head and to a pin 28 disposed within a bore defined by a substantially rectangular slot 288 in holder block 55 and the overlying holder cap 256. Ball bearing 280 is biased agains pin 28 by a compression spring 284 within bore 282. A limit pin 286 is located within bore 282 and concentrically within spring 284. The limit pin extends from holder plate 257, which dicloses the bore 282 at one end, and the ball bearing 280. The limit pin 286 restricts or limits the amount or the distance by which ball bearing 280 can be moved into bore 282. The limitation of movement of the ball into the bore prevents a pin 28 from deforming and extending into the bore under an abnormal situation, such as a "head crash."

Control System

The control system for the pin insertion apparatus is divided into three primary subsystems. The first subsystem is the table drive control system, the second is the automatic cycle control system, which comprises a recycling loop, interlocked with a plurality of microswitches for feedback into the control system, and the third is a manual control system, in which each step in a complete cycle is accomplished separately, but in sequence, according to a specific signal or command to accomplish each step.

The table drive control subsystem consists of a pair of stepping motors. One motor is used for each direction of travel or axis, an "X" direction or axis and a "Y" direction or axis. The motor drive of both axes are identical. Each motor has 200 discrete steps in one motor revolution. A spur gear driven by the motor drives a rack gear mounted on the table. The gearing is such that each revolution of the spur gear moves a rack gear, and accordingly the table, a distance of 2.5 inches. Each of the 200 steps in a revolution therefore represents 2.5/200 or 0.0125 inches of movement of the table in either an X or a Y direction. Each motor is driven by a translator card which is in turn driven by a pulse generator ring counter. Pulses from the pulse generator are channeled into inputs on the translator cards. If pulses are provided into one input of a translator card, the motor will go in one direction, for example clockwise, and if pulses are provided to another input the motor goes in the opposite direction, such as counter clockwise. With respect to table movement, the X motor moves right or left and the Y motor moves in or out.

The pulse generator is a ring counter which sends out bursts of pulses. Each burst contains four drive pulses for the translator card. Accordingly, each burst turns the motor four/200 of a revolution, or 0.050 inches. Interruption of the ring counter can only occur between, and not within, bursts. The bursts therefore guarantee and maintain a fine positioning of the table which is always some multiple of 0.050 inches from the previous position. Each burst of four pulses is within a given or predetermined time span and any time the ring counter pulse generator is started it must give an even multiple of four pulses. If a signal is received to stop movement of the table at a time within a burst of pulses, the pulse generator will complete the current four pulse burst prior to stopping. The .050 inch grid is maintained at all times in that manner.

Course positioning of the table is governed by a photo sensor system or photoelectric feedback system. As previously described in detail, a stationary photocell is mounted on the table support frame or other structure and a punched strip of metal is mounted on the moving table. In actual practice, photo sensors are mounted for both stops and limits for each of the X and Y axes, and a punched strip of metal is mounted on the moving table for each axis of movement. The movement of the table in both the X direction and the Y direction is accordingly coarse positioned by the photoelectric feedback system. Since the table moves only in one direction at a time, either in a Y direction or in an X direction, and since the stop and limit photo sensor systems are functionally alike, only one photoelectric feedback system need be described.

A stationary photocell and light source constantly interrogate a punched strip of metal and when a hole in the metal is encountered and is sensed by the photocell, the output signal from the photocell and from its amplifier interrupts the ring counter pulse generator and shuts down the motor after the current burst of pulses is complete. When commanded to drive, the motor drives the table in an appropriate direction until a hole in the strip is encountered. The photocell, upon sensing the hole, interrupts the pulse generator. When the ring counter is interrupted, it completes its current burst and then the motor is shut down. Thus the table is coarse positioned by the distance between holes in the metal strip and is fine positioned by the pulse generator. Since the ring counter pulse generator must complete a burst of four pulses, regardless of which it is interrupted during the course of a burst of pulses, the table will stop on the nearest 0.050 inch grid position after a particular hole is sensed. In that manner the appropriate holes are located on a circuit board on a 0.050 grid, or multiples of 0.050 inches, and the table of necessity stops on a multiple of 0.050 inches. A power failure or the like during a burst of pulses will stop the table off grid. The grid index system (see FIG. 8) will then be used to properly index the table.

Insertion of the pins into the board occurs when the board is moving from side to side, or right and left, in both directions. The side to side movement of the board is referred to as the "X" direction. However, pinning of the board is limited to movement of the board only one way in the "Y" direction, or when the board is moving "in" from front to back. Insertion of the pins starts at the back of or bottom of a board and moves from one side to the other side. When the board is located at the end of a row, the photocell and metal strip positioning system detects a limit hole and tells the X drive motor to reverse direction with respect to the X movement of the board. Before that occurs, the Y drive motor must incrementally move the board to the next row of holes on a circuit board. Accordingly, the insertion of the second row of pins occurs over or in back of the first row.

Sequentially, when the board has moved to its X extreme position and a limit has been sensed, the Y drive motor receives bursts of pulses that actuates the motor and moves the table (and the circuit board) an incremental distance until the photocell senses a stop hole in the Y drive metal strip. Upon sensing the hole the photocell interrupts the ring counter to stop the movement of the motor and of the table. When the current burst of pulses is completed, the motor shuts down and the table has then moved incrementally in the Y direction to the next row of pins, whereupon the X drive motor is reversed to move in the opposite direction and to sequentially move the board for pinning the new row.

In the case of the beginning of a new row, the board does not move in the X direction after the Y movement because the board is already positioned properly for the insertion of the first cluster of pins in the new row. It is therefore obvious that the table moves in one direction only for the insertion of each cluster of pins.

Incremental moves are sequentially made in an X direction until a particular row of pins has been completely inserted, whereupon the table is incrementally moved in the Y direction to a new row and the first cluster of pins is then inserted before the table moves in an X direction. When the Y "in" limit is reached, the table moves in the X direction to pin the last row on the board. At the X limit, the Y direction reverses and the table moves once in the Y "out" direction and then the system shuts off. It must then be manually moved to the Y "out" limit for changing the board. A new pinning cycle is then ready to begin. Since the last move was a Y move to a Y limit the first move will be an X move and movement will continue in the X direction until an X limit is sensed.

When the apparatus is in the automatic cycle mode the automatic cycle control which controls each individual movement of the apparatus is accomplished by means of a recycling loop. The recycling loop is interlocked with a plurality of microswitches for feedback control. The completion of one operation initiates the next operation through the sequential operation of the microswitches. A complete cycle, which begins with the insertion head loaded with pins, includes the following steps and the associated completion signals, each of which allows the next sequential step to occur:

1. Ram down - ram down limit switch
2. Ram up - ram up limit switch
Loader back - loader back limit switch
3. Loader in - loader in limit switch
Table move signal - photoelectric stop signal.

Sequentially, as the ram moves down and hits the ram down limit switch, the ram up circuit is then energized to raise the ram until the ram up limit switch is closed. As the ram moves up the loader moves back. After the loader moves back and hits and closes its limit switch, and the ram up limit switch is closed, the table moves to its next position, by either a movement in an X direction or in a Y direction, but not both X and Y directions at the same time. The movement of the loader "back" is followed by the movement of the loader "in" to load the pin insertion head. At the same time the loader moves in to load the insertion head, it hits the loader in limit switch which actuates the ram to move in the down position, thus repeating the cycle. The signal for the table to move which is actuated by the ram up and loader back limit switches is stopped by a photosensor signal as discussed above. The cycle will continue to repeat until the particular pin cluster inserted is the last in a board whereupon the cycling stops.

The signal that indicates that the board is filled is derived from a photosensor signal from the hole configuration on the metal strips. Accordingly, at the time the table moves to a new position and the hole pattern indicates that the board has been completed, the sequence of operation stops. It will be noted that at the time the table moves to a new position, the loader is moving in to load a head. Therefore, any particular cycle normally stops with the pin insertion head loaded with a cluster of pins and the next pin insertion cycle, after a loaded board has been removed and a new board is located on the table, begins with the head loaded and a ram down signal then inserts the first cluster of pins into a new board.

In addition to the circuitry just described, the electrical control system allows a single cycle to be accomplished, which is sometimes referred to as the "jog" mode, and it allows continuous cycling to be accomplished in the "auto" mode. When the system is not in a cycling mode, individual switches permit consecutive or sequential actuation of the ram, up and down, and the loader, back and in. Manual control is also provided for the X and Y table drive units and X and Y direction change. See FIG. 4. Normally the direction of a drive of the table changes automatically when a limit hole in a punched metal strip is sensed.

Figure 24A:
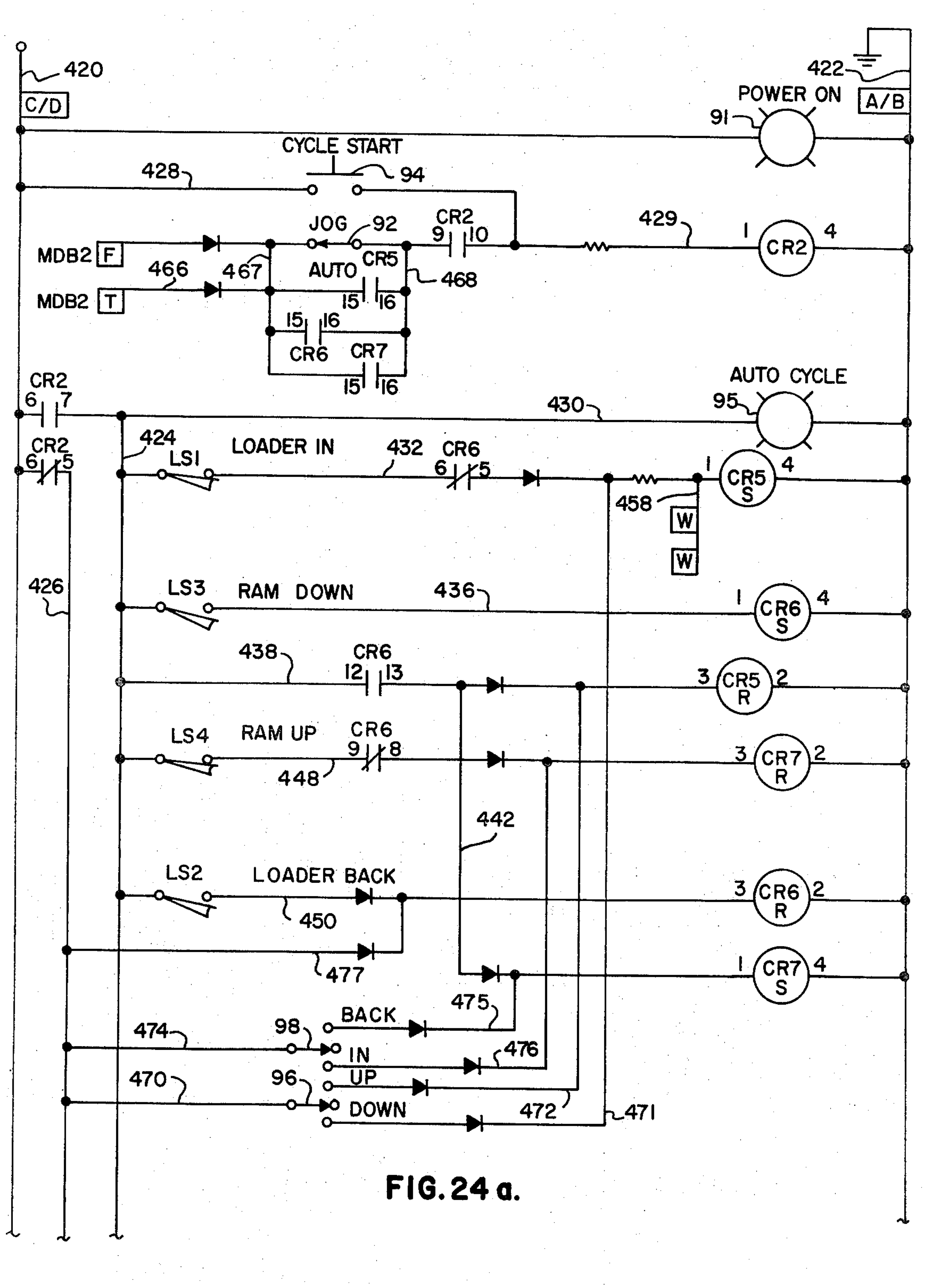
FIG. 24*a* is a schematic circuit diagram of the control system of the present invention.

Cycling starts when a "cycle start" button is pushed (see FIG. 24a). If the auto mode is selected an entire board will be pinned. The pinning will continue until the apparatus drops out of the auto mode, either from a power interruption or from the completion of a board. If the jog mode is selected, which is a cycling mode, a single cycle or "jog" is completed and the apparatus will then shut off. A cycle is completed from ram down and ram up, through loader back and in, and a table move. When the table stops, the apparatus turns off.

Figure 23:
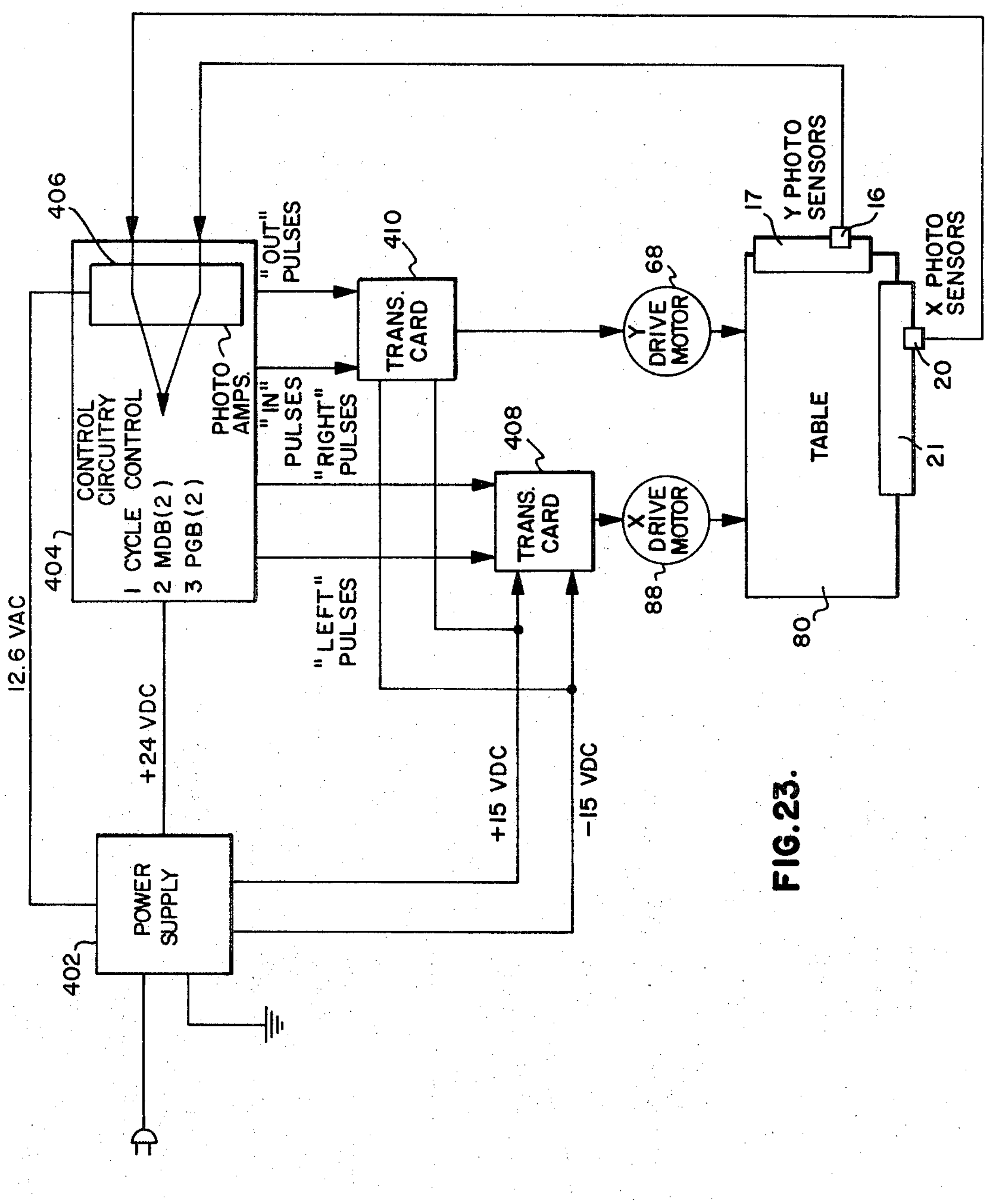
FIG. 23 is a schematic diagram of the control system of the present invention.

FIG. 23 comprises a schematic block diagram of the electrical control circuitry, including the power supplies, which are included in the present invention. A power supply 402 uses 110 volts ac, 60 cycle line voltage, and from the line voltage, transformers and rectifiers are used to produce four different voltages. The power supply provides 12.6 volts ac for photo amplifiers 406, +24 volt dc for the control system circuitry, and +15 and −15 volt dc for the translator cards which in turn power the motors.

A control block 404 includes cycle controls, two motor drive boards (MDB), one for each motor, and two pulse generator boards (PGB), again one for each motor. Also included within the control block are photo amplifiers 406 for the photosensors associated with the movement and control of the table. A 12.6 volt ac line extends from the power supply to the control block and provides power only for the photo amplifiers. A 24 volts dc line extends from the power supply to the control block and it provides power for the cycle controls, the motor drive boards, and the pulse generator boards. The table is moved by a pair of motors, one being designated as the X drive motor 88 and the other being designated as the Y drive motor 68. The X drive motor is a reversible motor which moves the table right or left in the X direction and the Y drive motor is a substantially identical motor which is used to move the table in or out in the Y direction. Each of the motors is controlled by a translator card which includes the logic for the motors.

From the control block 404, a pair of lines extend to each of the translator cards. One line of each pair provides pulses to move each motor in one direction and the other line of each pair provides pulses to move each motor in the opposite direction. Thus a pair of lines, one providing "left" pulses and the other providing "right" pulses, extends to X translator card 408 for the X drive motor. Similarly, a pair of lines extend to Y translator card 410. One line provides "in" pulses and the other line provides "out" pulses. The translator cards themselves utilize +15 volts dc and −15 volts dc, which voltages are provided by the power supply. A pair of conductors extend from the power supply to each of the translator cards 408 and 410 to provide the +15 and the −15 volts as required.

A ground return bus is provided between the power supply and each of the associated electrical circuitry, and while a ground is indicated only for the power supply, it is obvious that grounds must be provided as required throughout the circuitry.

The table 80 which moves in both X and Y directions, includes the punched metal strips 17 and 21 mounted thereon cooperating with photosensors 16 and 20, respectively. The Y photosensor 16 is mounted in a stationary manner with respect to the movement of the table in the Y direction. The photosensor with its light source and photocell is mounted in a stationary manner and the punched metal strip 17, which includes the stop and limit holes or apertures extending therethrough, is mounted on the table. The metal strip moves between the photocell and its light source. A conductor extends from the Y photosensor at the table to an amplifier and then to the Y motor drive board (MDB) within the control block 404.

The X direction photosensor 20 is mounted on the Y drive unit in a stationary manner with respect to the X movement of the table and it includes a photocell and a light source. Extending between the photocell and its light source is a metal strip 21 which also includes a plurality of stop and limit apertures or holes. A conductor extends from the X photosensor to an amplifier and then to the X motor drive board (MDB) in the control block 404.

While only one conductor is shown extending from each photosensor to amplifier block 406, it will be understood that more conductors are required. There is one amplifier for each photosensor system. That is, one amplifier is required for each photocell and light source. As herein described, each photosensor system includes a "stop" photocell and light source and a "limit" photocell and light source. Accordingly, two amplifiers are required for each photosensor system.

As indicated, photosensor system interrogates its punched metal strip and when a hole or aperture in the strip is sensed by the photocell, an appropriate signal is sent to a photo amplifier in block 406 in th e control block and from an amplifier to the appropriate motor drive board. Upon receiving the signal from a photo amplifier, the motor drive board turns off the ring counter pulse generator and as soon as the current burst of pulses is completed, the appropriate drive motor, X or Y, stops. The table is now appropriately positioned for the next cycle of pinning.

Figure 24B:
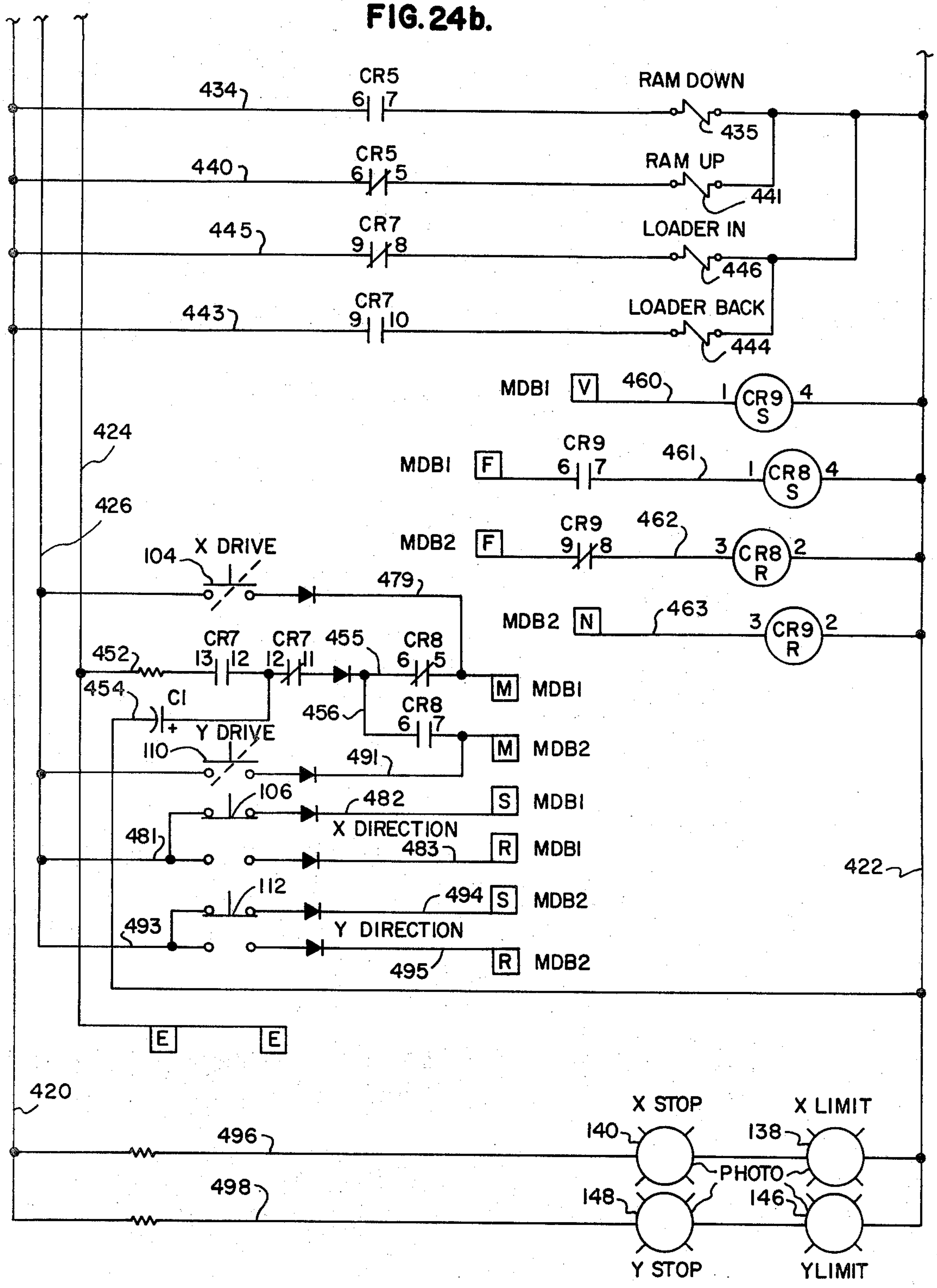
FIG. 24*b* is a continuation of the circuit diagram of FIG. 24*a;*.

FIGS. 24*a* and 24*b* comprise a schematic diagram of the electrical circuitry associated with the cycling operation of the pinning apparatus. It includes controls and circuits for both cycling modes, the automatic operation mode and the jog mode, and for the manual mode in which each of the operations is controlled sequentially by a manual control signal. It will be noted that, with reference to FIGS. 24*a* and 24*b*, and 25, certain abbreviations or nomenclature is used. For example, "CR" stands for, or is an abbreviation for, "control relay." Where appropriate or necessary to the functioning of the cycle controls, the letter S or the letter R is included by its appropriate control relay and refers either to the set or the reset condition of the relay. In FIGS. 24*a* and 24*b* the control relays are given numeric designations, while in FIG. 25 the relays are given alphabetical designations. For contact designations in the figures, the particular contacts of a designated control relay are indicated by numeric subscripts. Limit switches are designated by the abbreviation LS and they are numerically designated. While certain diodes and certain resistors are necessary for the functioning of the circuit and are indicated schematically in the figures, no specific identification is given to them because their functioning or purpose is well known by those skilled in the art. Other circuit components, such as resistors or diodes, may be required, depending on the particular component specifications. They have been eliminated for purposes of clarity. For example, suppression diodes have not been shown in parallel with the control relays. Moreover, no particular values have been assigned to any of the circuit components. These may be readily determined by those skilled in the art for their particular requirements.

The terms "line" and "conductor" are substantially synonymous and may generally be interchanged. However, the term "line" generally refers to a power supply conductor or a conductor to which a number of components may be connected. The term "conductor" generally refers to discrete conductors used as an interconnection between components or between components and a "line."

The abbreviations MDB1 and MDB2 will sometimes hereinafter be used to designate a specific motor drive board. MDB1 controls the X drive motor and MDB2 controls the Y drive motor.

Figure 25:
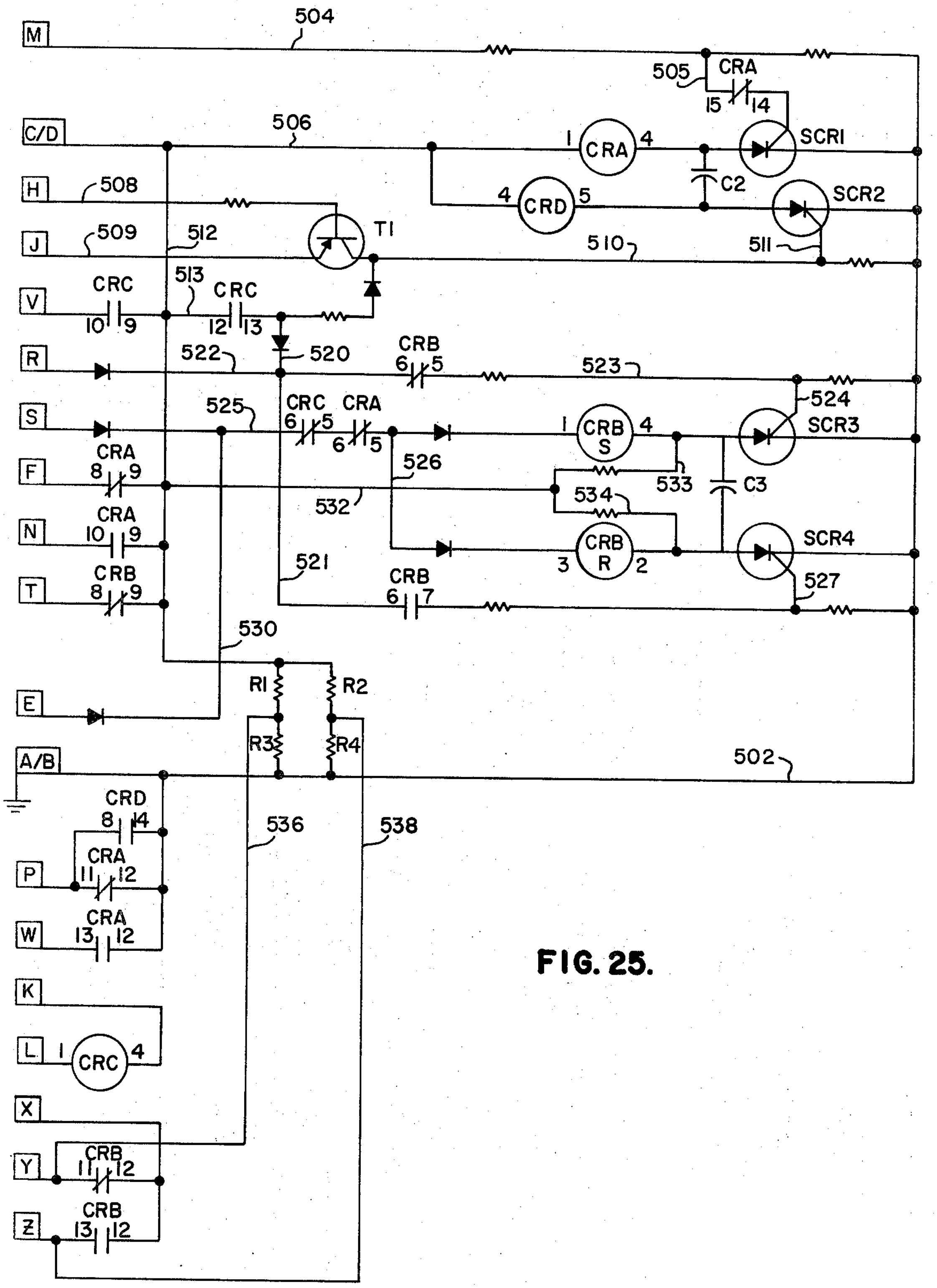
FIG 25 is a schematic circuit diagram of a motor drive board used with the circuits of 24*a* and 24*b*.

In FIGS. 24 and 25 motor drive board terminals are identified by an upper case (capital) letter in a square. If the terminal has a specific function to a particular motor drive board, the board will be identified. If no identification is given, the terminal is assumed to be functionally the same on both boards.

FIG. 24*b* is a continuation of FIG. 24*a* and both will be discussed hereinafter as a single composite figure unless specific differentiation between them is required. In FIG. 24, line 420 is connected to a +24 volt dc source, as from the power supply disclosed in FIG. 13. Line 422 on the right side of FIGS. 24*a* and 24*b* comprises a ground return line, as to the power supply. The required cycle circuitry and components extends between the two lines. A 24-volt dc supply line 424 for the automatic cycle extends from the main 24-volt supply line and is connected to the main supply line by contacts 6 and 7 of CR2. Another 24-volt supply line 426 for the manual mode of operation is also connected to the main 24-volt supply line by a pair of contacts 6 and 5 also from CR2. Contacts 6 and 5 are normally closed when CR2 is off, and contacts 6 and 7 are normally open when CR2 is off.

The first step in operating the pin insertion apparatus is to turn on the power for the apparatus. This is accomplished by power switch 90 (see FIG. 4). Among other thing, power is then applied to line 420 and indicator light 91 is on. As cycle start switch 94 is closed, contact is made with the 24-volt supply line 420 through conductors 428 and 429 to turn on CR2. With the function or mode switch 92 in the auto position, the cycling then is accomplished sequentially by use of the control relays and the limit switches. When CR2 is turned on, contacts 6 and 7 close and 5 and 6 open. The closing of contacts 6 and 7 connects the constant 24-volt supply line 420 to the limit switches and to the control relays by way of the auto cycle supply line 424. Auto cycle indicator light 95 is also turned on by power through conductor 430. The opening of contacts 6 and 5 of CR2 opens line 426 and disconnects it from the constant power supply line 420. The ram and the loader can thus not be operated manually while the apparatus is in a cycling mode with CR2 on. With the function switch 92 in the auto mode, contacts 15 and 16 of CR5, CR6, and CR7 are shorted out of the circuit and terminals F and T of MDB2, which are concerned with the "out" directional control of the Y drive motor are connected to CR2 through contacts 9 and 10.

As previously discussed, a pinning cycle beings with the head loaded with pins and with the head in the up position and the loader in. The last operation of the previous cycle and which completed the cycle, was the movement of the circuit board. The board is therefore in position for receiving a new cluster of pins. The initial condition as shown in FIG. 24 indicates that LS1, the loader in limit switch, is closed and the loader is therefore in. The ram is up and LS3, the ram down limit switch, is therefore open, and LS4, the ram up limit switch, is therefore closed. Since the loader is in, LS2, the loader back limit switch, is open. With CR2 on and LS1 closed, current then flows through conductor 432 and through contacts 5 and 6 of CR6 to the set coil of latching relay CR5. As CR5 is set, contacts 6 and 7 of CR5 close in conductor 434 and the ram down solenoid coil 435 is actuated to move the ram and the insertion head apparatus down. The solenoid coil controls a valve to provide air pressure for pneumatic actuator 340 to move the ram and the pin insertion head apparatus down.

As the ram moves down LS4 opens. When the insertion head and the ram have reached the down position to insert a cluster of pins into a circuit board, LS3 closes and allows current to flow through conductor 436 to set CR6. With CR6 set, contacts 6 and 5 in conductor 432 open to remove power from the CR5 (set) coil. Contacts 12 and 13 of CR6 close to provide power on conductor 438 to reset CR5 and thereby allow the ram to come up. The resetting of CR5 closes contacts 6 and 5 and power is connected from the 24-volt constant power line 420 through conductor 440 to ram up solenoid coil 441. The solenoid coil controls a valve on actuator 340 which provides pneumatic pressure to raise the pin insertion head apparatus. Current also flows through conductor 442 from conductor 438 to set CR7. As CR7 is set, contacts 9 and 10 close in conductor 443 to provide power to the loader back solenoid coil 444. The solenoid coil controls a valve of pneumatic actuator 170 to move the loader back. At the same time, contacts 9 and 8 of CR7 open in conductor 445 to prevent the loader from moving in.

As the ram comes up, LS3 opens and LS4 closes, providing current on conductor 448 across contacts 9 and 8 of CR6, which is reset by current on conductor 450 as the loader moves back and closes LS2. The reset of CR6 closes contacts 9 and 8 in conductor 448 and when the ram moves up and closes LS4, current flows from the supply lines 420 and 424 through conductor 448 to reset CR7. With CR7 reset, terminals 9 and 8 are closed in conductor 445 and current flows from the supply line to the loader in solenoid coil 446.

When the loader moves back, a cluster of pins drops to the bottom of the loading hopper to await being loaded into the head, as previously discussed in detail. As the ram raises and approaches its full up position, the head moves by the mechanical linkage into position where, at the topmost or upper position of the ram, with LS4 closed, the head is in position to receive a cluster of pins from the loading apparatus. Since the loader moves back faster than the ram moves up, by the time the ram is raised to its top or upper position and the head is in position to receive a cluster of pins, the loader is waiting to move in to load the head. The ram closes LS4 as it raises to its upper position and resets CR7. When CR7 is reset, contacts 9 and 8 of CR7 close and power is provided by conductor 445 to the loader in solenoid coil 446 to load a cluster of pins into the head.

Movement of the table is coordinated with the end of a pinning cycle so that the table moves and is in position to receive a new cluster of pins when the insertion head has been loaded. As the ram moves down to insert th e pins into the board, CR7 is set when LS3 closes. When CR7 is set, two events occur, one of which has been discussed. The event which has been discussed is the loader moving back by the setting of CR7 in conductor 442 which closes contacts 9 and 10 in conductor 443. The event which has not been discussed is the charging of capacitor C1. Contacts 12 and 13 of CR7 in conductor 452 are closed as CR7 sets and a capacitor C1 on conductor 454 is charged.

The charging of the capacitor occurs coincidentally with the ram moving down and closing LS3. As the ram comes up and closes LS4, CR7 on conductor 448 is reset to move the loader in and also to move the table. As CR7 is reset, contacts 12 and 13 of CR7 in conductor 452 open and capacitor C1 discharges through contact 11 and 12 of CR7, also in conductor 452, which are now closed. The capacitor discharges through contacts 11 and 12 and through a diode to terminal M of either motor drive board 1 (MDB1) or motor drive board 2 (MDB2).

The M terminal signals the pulse generator to start and the table is accordingly moved. MDB1 moves the table in the X direction and MDB2 controls movement of the table in the Y direction. Whether the capacitor discharges through MDB1 or MDB2 is determined by the state of CR8. If CR8 is set, MDB2 receives the pulse from the capacitor through contacts 6 and 7 in conductor 456 and the table accordingly moves in a Y direction. If CR8 is reset, contacts 5 and 6 in conductor 455 are closed and the capacitor discharges into MDB1, which moves the table in the X direction. The control of the direction or movement of the board is determined by the punched metal strips and the photosensors associated with them.

When terminal M of either MDB1 or MDB2 receives the discharge from the capacitor, a relay on the appropriate motor drive board is set which grounds contact W in conductor 458 to ground. Conductor 458 is connected to conductor 432 intermediate CR5S and both LS1 and contacts 6 and 5 of CR6. The grounding of conductor 432 and CR5S prevents the ram from moving down when the loader moves in to close LS1. Accordingly, the ram is unable to move down while the table is moving. When the table has completed its move and is in position for receiving the next cluster of pins, a relay on the appropriate motor drive board opens and contact W is no longer shorted to ground. Current then flows along conductor 432 through LS1 and through contacts 5 and 6 of CR6 to set CR5. CR5 contacts 6 and 7 in conductor 434 close to provide power to solenoid coil 435 to move the ram down and thus to begin a new pinning cycle.

Terminal V receives a signal from MDB1 when the table has reached the limit in the X direction. The signal originating with the X photosensor from the X limit photocell, and is transmitted to terminal V by the X limit photo amplifier. Thus the sensing of an X limit, either to the extreme left or to the extreme right, will result in a signal through terminal V which sets CR9 in conductor 460. When CR9 sets, contacts 6 and 7 in conductor 461 close and power from terminal F of MDB1 sets CR8. As CR8 is set, contacts 6 and 7 in conductor 456 close and contacts 5 and 6 in conductor 455 open. When the next table move signal occurs, by closing LS4 to reset CR7, the capacitor C1 in conductor 452 is discharged through conductor 456 to the M terminal into MDB2 and the table accordingly moves in a Y direction.

When the table moves in the Y direction, terminal N of MDB2 receives a signal on conductor 463 to reset CR9. With CR9 reset, contacts 9 and 8 of CR9 are closed in conductor 462 and current flows through contact F of MDB2 to reset CR8. At the same time contacts 6 and 7 of CR8 in conductor 456 open and contacts 6 and 5 in conductor 455 close. Conductor 456 is opened and terminal M OF MDB2 is disconnected from conductor 452 and from capacitor C1 on conductor 454. Now the capacitor is connected to terminal M of MDB1 through conductors 455, 452, and 454. At the next table move signal, the capacitor discharges to the M terminal of MDB1 which in turn signals the beginning of movement of the table in an X direction.

With function switch 92 in the jog position, the same sequence of events as described above, and which repeat automatically in the auto mode, are actuated manually for each complete cycle. The events must transpire sequentially because each control relay must still be actuated in sequence to allow the next event to occur. As previously indicated, the job mode is a cycling mode but only one cycle is completed upon command by actuating cycle start switch 94. When the function switch 92 is moved from the auto to the jog position, terminal F of MDB2 is disconnected from conductor 429 and CR2 is turned off to cut power from the auto cycle power line. When CR2 is turned off, terminals 6 and 5 in conductor 426 are closed to provide power from supply line 420 to the manual mode power supply line 426.

It will be noted that terminal T of MDB2 is also connected to conductor 429 and therefore to CR2 through conductor 466 and either directly through conductor 467 and function switch 92 in the auto mode or through conductor 468 by contacts 15 and 16 of any one of control relays 5, 6, or 7. That is, as long as CR5, CR6, or CR7 is set, terminal T of MDB2 provides power to keep CR2 on. However, at the end of a pinning cycle, all three control relays are reset and their contacts 15 and 16 are therefore open. Thus terminal T of MDB2 is disconnected from CR2 and the apparatus stops at the completion of a single cycle when function switch 92 is in the jog position.

To briefly recapitulate how CR5, CR6, and CR7 are reset may be advantageous. CR5 is reset when ram down limit switch is closed. CR6 is reset when loader back limit switch LS2 is closed. Finally, CR7 is reset when ram up limit switch LS4 is reset. The loader will move in as CR7 is reset and will close loader in limit switch LS1. However, CR5 will not reset because during the table move which occurs at the same time the loader moves "in," conductor 432 is grounded through terminal W of a motor drive board. Thus a single cycle ends with the head loaded after the table completes a move, but CR2 turned off at the beginning of the table and loader moves to end the cycling sequence.

Manual switches 96 and 98 are provided for movement of the loader and the head for, respectively, the "up" and "down" and the "back" and "in" functions.

Since a pinning cycle starts with the head loaded and the ram up and the loader in, the first movement, manually, comprises actuating the head or ram down by switch 96 which connects the manual mode power supply line 426 through conductor 470 and conductor 471 to conductor 432 to set CR5 which in turn closes contacts 6 and 7 in conductor 434 to provide current from line 420 for the ram down solenoid coil 435 and thus move the ram down. The manual switch 96 is then moved to the ram up function to provide power through conductor 472 to conductor 438 to reset CR5 and allow the ram to come up.

With the loader function switch 98 moved manually to the "back" position, power is applied from the manual power supply line 426 through conductor 474 to conductors 475 and 442 to set CR7. Contacts 9 and 10 in conductor 443 close to provide power to loader back solenoid coil 444 to move the loader back. With the function switch 98 moves to the "in" position, power is applied through conductors 474 and 476 to conductor 448 to reset CR7 and close contacts 9 and 8 in conductor 445 to apply power to loader in solenoid coil 446. This moves the loader in to insert a new cluster of pins into the head. It will be noted that the setting of CR6, when the loader function switch 98 is in the "back" position, has no effect on the charging of capacitor C1 to prepare for the movement of the table because C1 is charged from line 424 which is now disconnected. In the manual control mode, movement of the table is accomplished by manually depressing switches to move the table.

If the X drive switch 104 contacts are manually closed, the table moves in an X direction as power is applied directly from line 426 to terminal M of MDB1 through conductor 479. Similarly, if the Y drive switch 110 is manually closed, power is applied directly from line 426 through conductor 491 to contact M of MDB2 for movement of the board in a Y direction. When the X drive and the Y drive switches are manually closed, the photosensor stop amplifiers are inhibited to allow movement of the table past each stop hole in order to position the board manually as desired. As indicated by the dashed lines through switches 104 and 112, the switches include other contacts. The other contacts are used to inhibit the photosensor stop amplifiers. Thus the table may be driven in a desired direction until the table is located as desired or until a limit hole is sensed and the table will then stop. Note that only the photo stop amplifiers are inhibited, not the photo limit amplifiers.

To move the table in an X or Y direction incrementally between stops, the drive switches 104 or 110 need only be depressed momentarily and then released. If it is desired to move the table a greater distance, a switch must be depressed for and during the desired movement. However, momentarily depressing a drive switch and immediately releasing it causes a drive motor to drive and once a burst of pulses has been started, the burst will continue until it has been completed. Thus, if the switch is momentarily depressed and then released, the motor will begin and will move the table an incremental distance as defined by the burst of pulses.

X directional control switch 106 is connected to both terminal S and R of MDB1. The switch is spring loaded to connect terminal S to power line 426 through conductors 481 and 482. When switch 106 is depressed, terminal R is connected to power line 426 through conductor 481 and 493. Depressing switch 106 to connect terminal R to power line 426 disconnects terminal S from the power line and results in a change of direction of the X drive unit. That is, the X drive motor reverses direction when switch 106 is depressed to provide power to terminal R of MDB1 and to remove power from terminal S of MDB1.

The Y directional control switch 112 is connected to terminals R and S of MDB2 in a manner substantially the same as switch 106 is connected to terminals R and S of MDB1. Switch 112 is normally closed to contact terminal S to power line 426 through conductors 493 and 494. To reverse the direction of drive of the Y drive motor, switch 112 is depressed to disconnect terminal S from power line 426 and to connect terminal R to the power line through conductors 493 and 495.

Terminals R and S will be discussed in detail below in conjunction with FIG. 25, where the circuitry associated with terminals R and S is shown.

Conductor 496 provides power from constant power supply line 420 to the X photosensor system light sources, including X limit light source 138 and X stop light source 140.

Conductor 498 provides power from line 420 to the Y photosensor system light source, including Y limit light source 146 and Y stop light source 148.

Terminals E of both MDB1 and MDB2 are connected to auto mode power supply line 424. The function of terminals E will be given in conjunction with FIG. 25.

FIG. 25 is a schematic circuit representation of a motor drive board (MDB) used for both the X (MDB1) and the Y (MDB2) drive systems. Each drive board includes a plurality of terminals which are identified on the left side of the figure by letters of the alphabet. Terminals C/D are connected to the +24 volt dc power supply line 420 of FIG. 24. Terminals A/B are connected to ground return line 422 of FIG. 24. Conductor 502 is connected to terminals A/B and is the ground line for the motor drive boards.

Terminal M is the X and Y drive start terminal. Capacitor C1 from FIG. 24 is discharged through terminal M of MDB1 or MDB2, as appropriate. The input from terminal M flows through conductors 504 and 505 and through contacts 14 and 15 of CRA which are normally closed when CRA is off. The input turns on SCR1 which allows current to flow from terminals C/D through conductor 506 to turn on CRA. When CRA is on, a drive motor is on.

When a stop hole is sensed in a punched metal strip through a photosensor system, power from a photo stop amplifier is applied to terminals H and J to turn CRA off. Terminal H is connected to the base of T1 through conductor 508 and terminal J is connected to the emitter of T1 through conductor 509. The power from a photo stop amplifier to H and J therefore turns T1 on and in turn SCR2 is turned on through conductors 510 and 511. When SCR2 is turned on, SCR1 turns off and CRA turns off. When SCR2 turns on, CRD is also turned on. In practice, CRA is a relatively slow acting relay and CRD is a relatively fast acting relay. Since a fast acting relay is required to turn a drive motor off, CRD is placed in the circuit with CRA to rapidly turn the motor off. SCR1 and SCR2 act, with their relays, in a manner not dissimilar from a flip-flop in that turning one on commutates the other to turn it off.

When CRA is turned on by an input signal through terminal M, contacts 15 and 14 of CRA are opened in conductor 505 to prevent another input to the base of SCR1. Accordingly, until CRA is turned off by SCR2, no signal can be sent to the base of SCR1.

It will be noted, as discussed above, that when a stop or a limit signal is received from the photocell and its amplifier system to turn the motor off, the ring counter pulse generator continues and finishes its current burst of pulses to index the table precisely on the desired grid in order to receive the next cluster of pins. Thus the turning off of CRA comprises the coarse positioning of the table by turning off the pulse generator.

Referring now to terminals K and L at the lower portion of the figure, it will be noted that CRC extends between terminals K and L. Terminals K and L are connected to the X and the Y limit amplifiers and thus CRC is turned on by the limit photo amplifiers. When the limit of travel in an X or a Y direction is reached and is sensed by the X or Y limit photo amplifiers, a signal is received across terminals K and L which turns on CRC. In turn, contacts 10 and 9 of CRC at terminal V are closed, to allow CR9 to be set (see FIG. 24). Terminals 12 and 13 of CRC in conductor 513 are also closed. The closing of terminals 12 and 13 as CRC is turned on connects the 24 volt supply through terminals C/D and conductors 506, 512, 513 and 510 to the base of SCR2. Thus SCR2 is turned on which in turn turns off CRA and stops the drive motor when either a signal is received from a photo stop amplifier through terminals H and J or from the limit photo amplifiers through terminals K and L.

Terminal V is used only with MDB1. When CRC is on, current from conductor 506 through conductor 512 and across contacts 10 and 9 of CRC flows through terminal V and sets CR9 (see FIG. 24). As indicated previously in conjunction with FIG. 24, CR9 is set only at an X limit and changes the direction of drive from X to Y.

The direction of drive of a motor is controlled by CRB. When CRB is set, the directions of drive are "right" for X and "out" for Y. When CRB is reset, the directions of drive are "left" for X and "in" for Y.

The state of CRB is controlled by SCR3 and SCR4. When SCR3 is on, CRB is set. When SCR4 is on, CRB is reset. The action of SCR3 and SCR4 is similar to that of SCR1 and SCR2 with respect to CRA. That is, when either SCR3 or SCR4 turns on, the other turns off. Accordingly, CRB is either set or reset. When CRB is reset, contacts 6 and 5 in conductor 523 close, and contacts 6 and 7 in conductor 521 open.

SCR3 and SCR4 are connected to a power source through conductor 512 through conductor 532 and, for SCR3, conductor 533, and for SCR4, conductor 534. When a limit hole is sensed and CRC at terminals K and L is turned on, CRC contacts 12 and 13 in conductor 513 are closed. This allows current through conductors 512 and 513 to flow through conductor 520 to conductor 523 and 524 to turn on SCR3. When SCR3 turns on, CRB is set by current from terminal S and conductor 525 in the manual mode, or from current from terminal E and conductors 530 and 525 in the auto mode.

Contacts 6 and 5 of CRA in conductor 525 prevent current from flowing to CRBS, or to CRBR in conductor 526, when CRA is on. This prevents a change of direction while a motor is on and driving. Contacts 6 and 5 of CRC are adjacent contacts 6 and 5 of CRA in conductor 525. Contacts 6 and 5 work in conjunction with contacts 12 and 13 of CRC in conductor 513. Since current through conductors 513 and 520 turns on either SCR3 or SCR4, current through conductor 525 to CRB is momentarily disconnected through terminals 6 and 5 of CRC in conductor 525 while either SCR3 or SCR4 is being turned on. When CRC turns off, disconnecting conductor 520 from conductor 513 with respect to SCR3 and SCR4, contacts 6 and 5 in conductor 525 close to allow current to flow to either CRBS or CRBR. In the illustration given, SCR3 has just been turned on and thus when CRA turns off and CRC turns off, CRB will set.

With CRB set, contacts 13 and 12 at terminal Z will close and contacts 11 and 12 at terminal Y will open to reverse the direction of the drive motor.

When CRB sets, contacts 6 and 7 in conductor 521 close and contacts 6 and 5 in conductor 23 open. Thus the next input signal from a photo limit amplifier which turns on CRC will allow current to flow from conductor 506 through conductors 512, 513, 520, 521 and 527 to turn on SCR4. With SCR4 on, current will flow from conductor 525 through conductor 526 to reset CRB and thus to reverse the direction once again when next a limit hole is sensed to turn on CRC.

In the auto mode, terminal E is connected to auto mode supply line 424 (see FIG. 24) and provides current through conductor 530 to conductor 525 to either set or reset CRB. In the manual mode, current is provided to set or reset CRB through terminal S which is connected to conductor 525 and to the manual mode supply line 426 of FIG. 24.

Terminal S is normally connected directly to the manual mode supply line 426 to provide power to CRBS through conductor 525 or to CRBR through conductors 525 and 526. If a reversal of direction is desired, depressing either X directional change switch 106 or Y directional change switch 112 momentarily disconnects terminal S from power supply line 426 and connects the power to the R terminal of either MDB1 or MDB2, respectively. Terminal R is connected to conductor 522 and to SCR3 by conductors 523 and 524 and to SCR4 by conductors 521 and 527. If CRB is reset, terminals 6 and 5 in conductor 523 will be closed and terminals 6 and 7 in conductor 521 will open. Thus current will flow through terminal R when a directional change switch is depressed and through conductors 522, 523, and 524 to SCR3. When SCR3 turns on, as the switch is released to connect terminal S to the manual mode supply line, power will then flow through conductor 525 from the S terminal to set CRB.

With CRB set, contacts 6 and 7 in conductor 521 will close and contacts 6 and 5 in conductor 523 will open. Accordingly, when the directional change switch is again momentarily depressed, current will flow from terminal R through conductors 522, 521, and 527 to turn on SCR4. When the switch is again released, current will flow through terminal S to CRBR through conductors 525 and 526. Again, a change of direction will result.

Terminal F on MDB1 is connected to CR8S (see FIG. 24). Power through terminal F from conductors 506 and 512 flows through contacts 8 and 9 of CRA when CRA is off to set CR8 when CR9 is set. This has been described above in conjunction with terminal V and the change of direction from X to Y when an X limit has been sensed by the photo amplifier system by an output from the X limit amplifier through terminals K and L, which turns CRC on. When CRA is on, terminals 8 and 9 at contact F are open and no current can flow to set CR8. Thus current can only flow to terminal F when a motor is not driving.

Terminal F on MDB2 is connected to CR8R and to the auto cycle latch relay CR2 when the auto/jog function switch 92 is in the auto position. As with terminal F with MDB1, terminal F of MDB2 is associated with CR8 when the Y limit has been sensed by the photosensor system and the Y limit photo amplifier indicates that movement must be reversed in the Y direction.

When an X limit has been reached, the K and L terminals of MDB1 receive an output from the X limit amplifier and CRC is turned on. When CRC is turned on, contacts 10 and 9 of CRC close at terminal V to set CR9. See FIG. 24*b*. When CR9 sets, contacts 6 and 7 close in conductor 461 to allow current through terminal F to set CR8. In order to provide current to terminal F, CRA must be off to close contacts 8 and 9 between the terminal and conductor 512 (of FIG. 25). Thus the sensing of the X limit hole on the punched metal strip provides power through terminal V to set CR9.

When CRA turns off and the motor stops, power from conductor 412 and contacts 8 and 9 of CRA at terminal F then sets CR8. The table is now ready to move in a Y direction. When a signal through terminal M turns on CRA and the table starts to move again, contacts 10 and 9 of CRA at the N terminal of MDB2 allow current to flow to reset CR9. As CR9 resets, terminals 9 and 8 of CR9 at terminal F of MDB2 close to allow CR8 to be reset when the motor stops driving and CRA turns off to close contacts 8 and 9 at the F terminal. Thus the next move will be in the X direction.

Terminal N has been discussed in the preceding paragraph and in conjunction with FIG. 24. After a move in a Y direction, terminal N, of MDB2 only, resets CR9 to move in an X direction. When CRA turns on during a move, contacts 10 and 9 at terminal N close to provide power from conductor 512 through terminal N and conductor 463 (FIG. 24*b*) to reset CR9. Resettting CR9 allows CR8 to be reset by power through terminal F of MDB2. CR8R closes contacts 6 and 5 in conductor 455 and opens contacts 6 and 7 in conductor 456. Thus the next motor starting pulse from capacitor C1 is through terminal M of MDB1, which results in table movement in an X direction.

The E terminal of both MDB1 and MDB2 is connected directly to the 24-volt auto mode supply line 424. It provides a constant 24 volts when the selector switch is in the auto mode and CR2 is on through conductor 520 to conductor 521 and to either CRB set or CRB reset to provide for a change of direction of the table drive motors.

Contact P is an inhibit contact connected to the pulse generators to inhibit the X and Y drive motors when CRA is not on by shorting the pulse generators to ground. This prevents movement of the table when CRA is off. Since CRA is slow acting, terminal P is also connected to contacts 8 and 14 of CRD so that when CRD is turned on the pulse generators are also shorted to ground. When CRA is on, and CRD is accordingly off, terminal P is not shorted to ground and a pulse generator is on and is accordingly providing drive pulses for a drive motor. When CRA turns off or when CRD is turned on, terminal P is shorted to ground and the pulse generator turns off after the completion of its current burst of pulses.

The W terminal inhibits movement of the rams when CRA is on by closing contacts 13 and 12 of CRA and thus shorting the rams to ground. The W terminals of both MDB1 and MDB2 are connected to conductor 432 of FIG. 24.

Terminals K and L are connected to the X and Y limit amplifiers. They have been previously discussed with reference to turning off CRA. They function additionally to reverse the direction of drive of the motors. When the photosensors detect a limit hole in the punched metal strip, a signal through terminals K and L turns CRC on. In case of an X limit, contacts 10 and 9 at terminal V are closed to set CR9. This closes terminals 6 and 7 in conductor 461 (FIG. 24*b*) and provides power through terminal F of MDB1 to set CR8. When CR8 sets, contacts 6 and 7 in conductor 456 close to allow capacitor C1 to discharge through terminal M of MDB2. When CR8 sets, contacts 6 and 5 in conductor 455 open. A Y move is therefore made after an X limit is sensed.

As has been previously discussed, an X move is made after each Y move. Terminals 12 and 13 of CRC in conductor 513 close to connect the 24-volt power supply conductors 506 and 512 to conductor 520 to reverse the direction of drive. The direction change is accomplished as described above with reference to control relay CRB.

Resistors R1 and R3 are connected in series between conductor 512 and ground conductor 502. Conductor 506 extends from intermediate R1 and R3 to terminal Y. Resistors R2 and R4 are also serially connected between conductor 512 and ground conductor 502. Conductor 538 extends from intermediate R2 and R4 to terminal Z. Terminals Y and Z are connected to motor translator cards to drive the motors. Resistors R1 and R2 are provided to drop the +24 volts from conductor 512 to +15 volts for the translator cards. The translator cards are thus biased at +15 volts from terminals Y and Z. Terminal Y provides output pulses for "left" and "in" from MDB1 and MDB2, respectively, when CRB is reset to close contacts 11 and 12. Terminal Z provides output pulses for "right" and "out" from MDB1 and MDB2, respectively, when CRB is set to close contacts 13 and 12.

Terminal X receives an input from a pulse generator and transmits it to a translator card through terminals Y or Z to drive the X or the Y motor. The input pulse through terminal X is a shorting pulse to short resistors R3 or R4 to ground through conductors 536 or 538, respectively, depending on the direction or state of CRB. The shorting of one or the other resistor provides a negative going 15 volt pulse to terminal Y or Z.

When a pulse from terminal X shorts out a resistor, then a negative going pulse is sent to either Y or Z, depending on the state of CRB. Since the card is biased at 15 volts, when one of the resistors is shorted to ground, the 15 volts is thus shorted to ground. A negative going pulse, that is, a pulse going from +15 to ground, is therefore sent to the translator card through either contact Y or Z.

Terminal T is used in conjunction with terminal F to disconnect the auto cycle (FIG. 24*a*) when the pinning of a board has been completed. Both terminals T and F are connected to the auto latch. CR2 is held on by F and T of MDB2. Contacts 8 and 9 of CRB are closed and power is on terminal T and to the auto cycle latch while the board is moving in. CRB is reset while the board is moving in during pinning operations, and is set when the "in" limit is sensed. When CRB sets, contacts 8 and 9 at terminal T open and current from conductor 512 no longer flows through the terminal to conductor 466 (of FIG. 24*a*).

The F terminal is off when CRA is on. As the Y drive motor turns on to drive "out," the F terminal drops out when CRA contacts 8 and 9 open. The conditions have been fulfilled that both F and T terminals are off and CRA is therefore turned off. The system then drops to the manual mode.

After the board has thus been completed, and the auto mode drops out, the Y drive switch 110 must be pressed to move the board to the "out" limit. Since the direction of Y is "out" by having CRB set, the Y drive motor will move the table to the out limit and will then stop when the limit is sensed. When the limit is sensed, CR8 is reset and the board is ready for an initial movement in the X direction. The finished circuit board may be removed from the table, a new one inserted. The cycle is then started again by pushing the cycle start switch 94, with the function switch 92 in the auto mode, to turn on CR2 and to begin pinning a new circuit board.

There has now been disclosed new and useful pin insertion apparatus for inserting clusters of straight pins into a circuit board sequentially by automatic cycling or singly upon manual command. Straight pins are used and, from a bulk configuration, the pins move to loading apparatus which aligns the pins in parallel stacked clusters and loads clusters into a pin insertion head. The pin insertion head pivots or flips from the loading apparatus to a circuit board and inserts the pins into the board. The head then pivots or flips back to the loading apparatus to receive a new cluster of pins and the circuit board is moved to receive the next cluster. Drive units move the table and control circuitry controls the drive units and changes and reverses directions of drive either automatically or on command.

While the principles of the invention have been made clear in illustrative embodiments, there will be immediately obvious to those skilled in the art many modifications of structure, arrangement, circuits, and components used in the practice of the invention, and otherwise, which are particularly adapted for specific environments and operating requirements, without departing from those principles. For example, various fastening means and circuit components may be used or substituted for those disclosed. All such modifications are well known to those skilled in the art. No specific structural materials have been disclosed since various appropriate materials are available. The appended claims are intended to cover and embrace any and all such modifications, within the limits only of the true spirit and scope of the invention.

What is claimed is:

1. Apparatus for sequentially inserting clusters of straight pins into a circuit board comprising, in combination:
- support means for supporting and moving a circuit board;
- inserting head means for sequentially inserting clusters of straight pins into the circuit board;
- loading means for sequentially loading clusters of straight pins into the insertion head means; and
- control means for controlling the moving of the support means and the circuit board, the loading of the pins into the insertion head, and the insertion of the clusters of pins from the insertion head into the circuit board.

2. The apparatus of claim 1 in which the control means controls movement of the support means in response to movement of the loading means and the insertion head means.

3. The apparatus of claim 2 in which the control means controls movement of the loading means in response to movement of the insertion head means.

4. The apparatus of claim 1 in which the insertion head means includes:
- slotted means for receiving a cluster of straight pins from the loading means;
- means for pivoting the slotted means from the loading means to the circuit board;
- ram means for removing the cluster of straight pins from the slotted means and for inserting the pins into the circuit board.

5. The apparatus of claim 4 in which the slotted means includes a plurality of slots for receiving a plurality of straight pins, said plurality comprising a cluster of pins, and biasing means for releasably biasing the pins into the slots.

6. The apparatus of claim 5 in which the ram means includes:
- a plurality of rods movably disposed in the plurality of slots in contact with the plurality of pins therein;
- a block connected to the rods for providing simultaneous movement of the rods; and
- a ram movable in response to the control means to move the block and the rods to insert the cluster of pins into the circuit board.

7. The apparatus of claim 1 in which the loading means includes:
- a base plate;
- loading hopper means disposed on said base plate for receiving said storing clusters of straight pins; and
- pusher means disposed on said base plate for pushing a cluster of pins from the loading hopper into the insertion head means.

8. The apparatus of claim 7 in which the loading hopper means comprises:
- a bin housing;
- bin frame means pivotally secured to the bin housing and including a plurality of bins for receiving and storing the straight pins;
- a sloping bottom portion on the bin frame adjacent the base plate and terminating at a bottom edge on the base plate for pivoting the bin frame in response to urging of the pusher means as the pusher means contacts the sloping bottom portion of the bin frame while pushing a cluster of pins from the bin frame into the insertion head means.

9. The apparatus of claim 8 in which the pusher means includes a pusher blade disposed and movable on the base plate beneath the bin frame to push the cluster of pins and to pivot the bin frame.

10. The apparatus of claim 9 in which the pusher means further includes:
- an actuator for moving the pusher blade in a first direction to push a cluster of pins from the bin hopper into the insertion head means and to pivot the bin frame on the bin housing, and for moving the pusher blade in a second direction away from the insertion head means and from beneath the bin frame.

11. The apparatus of claim 10 in which the bin frame means includes:
- a plurality of bin laminations, each of which is substantially the width of a straight pin;
- a spacer between each of said plurality of bin laminations defining with the bin laminations a plurality of bins for receiving a plurality of straight pins in stacked parallel alignment.

12. The apparatus of claim 11 in which the loading hopper means includes spring means for biasing the bin frame against the base plate as the pusher blade moves from beneath the bin frame to urge a pin from each of said bins within the bin frame downwardly against the base plate, said pin from each of said bins comprising a cluster of pins.

13. The apparatus of claim 7 in which the loading means further includes:
- a support plate;
- a first bracket secured to said support plate;
- a second bracket secured to said supply plate;
- a bar adjustably secured to the support plate and extending between the first and second brackets;
- a plate secured to said bar;
- a third bracket secured to said plate for supporting the base plate; and screw means extending through said first and second brackets to said bar for positioning said bar on said support plate.

14. The apparatus of claim 1 in which the support means comprises:

a first drive unit for moving the circuit board in a first direction, said first drive unit including a pair of end braces, each of which includes a rack secured thereto, a first drive motor, a shaft coupled to and driven by said first drive motor, a pair of gears secured to and movable with said shaft and meshing with the racks secured to the end braces;

a second drive unit for moving the circuit board in a second direction disposed on and movable with said first drive unit, said second drive unit including a table frame, a rack secured to said table frame, a second drive motor, a shaft coupled to and driven by said second drive motor, a gear secured to and movable with said shaft and meshing with the rack secured to the table frame;

photo sensor means for said first and said second drive units coupled respectively to said first and said second drive motors for stopping said drive motors in response to a signal from said photo sensor means; and program means disposed adjacent the photo sensor means and movable with the drive units to provide a source for the signal from the photo sensor means in response to movement of the drive units.

15. The apparatus of claim 14 in which the support means further includes indexing means for manually aligning a drive unit and a circuit board thereon to receive a cluster of pins comprising, in combination:

a grid index disposed on and movable with the drive unit, said grid index including a plurality of spaced apart parallel index lines, each of which corresponds to a row along which the circuit board may receive clusters of pins from the insertion head means;

a disc secured to and rotatable with said shaft, said disc including circumferential periphery having a plurality of spaced apart index marks extending axially of said disc and said shaft circumferentially about the periphery of said disc, said index marks corresponding to incremental movements of said drive motor and shaft and of said drive unit; and an index pointer disposed adjacent said disc and said grid index for aligning the index lines on said grid index with the index marks on said disc to align the drive unit and circuit board.

16. The apparatus of claim 1 in which the insertion head means includes:

an insertion head for holding a cluster of pins;

ram means movable for inserting the cluster of pins from the insertion head into the circuit board;

guide housing means for aligning the insertion head with the circuit board; and means for pivoting the insertion head between the guide housing and the loading means.

17. The apparatus of claim 16 in which the means for pivoting the insertion head comprises:

a trapeze harness secured to the insertion head and pivotally secured to the guide housing;

an offset portion of said trapeze harness; and a trapeze strap extending from said ram means to said offset portion of the trapeze harness for pivoting said trapeze harness and the insertion head secured thereto in response to movement of the ram means.

18. Apparatus for positioning a moving table, comprising, in combination:

programming means secured to and movable with said moving table;

detector means for detecting the programming means and for providing an output signal in response to said programming means;

a motor for moving said table in discrete increments in response to bursts of pulses;

a pulse generator for providing bursts of pulses for driving said motor incrementally in response to each burst; and means for stopping the bursts of pulses from the pulse generator in response to the output signal from the detector means at the end of the burst of pulses in progress at the time of said output signal from the detector means.

19. The apparatus of claim 18 in which the programming means comprises a metal strip having a plurality of holes extending through said metal strip; and the detector means comprises a photosensor system including a light source and a photocell disposed adjacent the metal strip and the photocell provides an output signal in response to a hole in the metal strip.

20. In apparatus for inserting pins in a circuit board, said apparatus including a pin insertion head, a ram for moving said insertion head, a loader for loading pins into said insertion head, and a table for moving the circuit board, control means for sequentially controlling the ram, the loader, and the table, comprising, in combination:

first circuit means for moving the ram in a down direction in response to movement of the loader in a forward direction;

second circuit means for moving the ram in an up direction and for moving the loader in a back direction in response to movement of the ram in the down direction;

third circuit means for moving the loader in a forward direction and for moving the table in response to movement of the loader in a back direction and movement of the ram in an up direction; and fourth circuit means for inhibiting the first circuit means while the table is moving.

21. The apparatus of claim 20 in which:

the first circuit means comprises a loader in limit switch, a first control relay, and a first solenoid coil, and said first control relay is set by said loader in limit switch to provide power to the solenoid coil to move the ram in a down direction;

the second circuit means comprises a ram down limit switch, a second control relay, a third control relay, a second solenoid coil, and a third solenoid coil, and the second control relay is set by said ram down limit switch and said second control relay sets the third control relay to provide power to the second solenoid coil to move the loader in a back direction and said second control relay also resets said first control relay to provide power to the third solenoid coil to move the ram in an up direction;

the third circuit means comprises a loader back limit switch, a ram up limit switch, and a fourth solenoid coil, and said loader back limit switch resets the second control relay, and the third control relay is reset by the ram up limit switch in response to the resetting of the second control relay, and power is provided to the fourth solenoid coil to move the loader in a forward direction in response to the resetting of the third control relay, and the table is moved in response to the resetting of the third control relay; and the fourth circuit means comprises means for grounding the first control relay to prevent the setting thereof while the table is moving.

22. Apparatus for reversing the direction of drive of a movable table, comprising, in combination:

a drive motor for driving said table in a first direction and in a second direction, said motor including a first input terminal for driving the motor and the table in a first direction, and a second input terminal for driving the motor and the table in a second direction;

means for providing output signals in response to desired reversals of direction of drive for the table;

a control relay having a set state and a reset state;

a first silicon controlled rectifier, having a conducting state and a nonconducting state and being switchable by an input signal to the conducting state to change the control relay to the set state;

a second silicon controlled rectifier having a conducting state and a nonconducting state and being switchable by an input signal to the conducting state to change the control relay to the reset state;

capacitor means disposed between the silicon controlled rectifiers to commutate either one of the silicon controlled rectifiers to change it to a nonconducting state in response to an input signal to the other of the silicon controlled rectifiers to change the state of the said other of the silicon controlled rectifiers to a conducting state;

first input signal means to switch the first silicon controlled rectifier to a conducting state and to set the control relay in response to an output signal for a desired reversal of direction of drive and in response to the reset state of the control relay;

means for providing an input to the first input terminal of the drive motor for driving the motor and the table in a first direction in response to the set state of the control relay;

second input signal means to switch the second silicon controlled relay to a conducting state and to reset the control relay in response to another output signal for another reversal of direction of drive and in response to the set state of the control relay; and means for providing an input to the second input terminal of the drive motor for driving the motor and the table in a second direction in response to the reset state of the control relay.

* * * * *